US011014000B2

(12) United States Patent
Koyama et al.

(10) Patent No.: US 11,014,000 B2
(45) Date of Patent: May 25, 2021

(54) SIMULATION SYSTEM, PROCESSING METHOD, AND INFORMATION STORAGE MEDIUM

(71) Applicant: BANDAI NAMCO ENTERTAINMENT INC., Tokyo (JP)

(72) Inventors: Junichiro Koyama, Yokohama (JP); Akio Onda, Warabi (JP); Takashi Aoki, Funabashi (JP); Norihiro Nishimura, Tokyo (JP); Toru Hisano, Tokyo (JP); Yuji Iizuka, Yokohama (JP); Hiroumi Endo, Tokyo (JP); Kenichi Nagashima, Tokyo (JP); Hiroki Yakata, Tokyo (JP); Kentaro Tamura, Saitama (JP); Akinari Ushiguchi, Yokohama (JP); Koji Inokuchi, Yokohama (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/415,182

(22) Filed: May 17, 2019

(65) Prior Publication Data
US 2019/0329136 A1    Oct. 31, 2019

Related U.S. Application Data

(63) Continuation of application No. PCT/JP2017/040957, filed on Nov. 14, 2017.

(30) Foreign Application Priority Data

Nov. 18, 2016 (JP) .............................. JP2016-225408

(51) Int. Cl.
*A63F 13/577* (2014.01)
*A63F 13/211* (2014.01)
(Continued)

(52) U.S. Cl.
CPC .......... *A63F 13/577* (2014.09); *A63F 13/211* (2014.09); *A63F 13/212* (2014.09);
(Continued)

(58) Field of Classification Search
None
See application file for complete search history.

(56) References Cited

U.S. PATENT DOCUMENTS 5,900,849 A *  5/1999  Gallery .................. G06F 3/011
                                                  273/148 B
6,561,809 B1 *  5/2003  Lynch ...................... F41G 3/26
                                                  434/16
(Continued)

FOREIGN PATENT DOCUMENTS

JP      H11-309269 A    11/1999
JP      2002-73246 A     3/2002
(Continued)

OTHER PUBLICATIONS

Feb. 6, 2018 International Search Report issued in International Patent Application No. PCT/JP2017/040957.

*Primary Examiner* — Seng H Lim
(74) *Attorney, Agent, or Firm* — Oliff PLC

(57) ABSTRACT

A simulation system includes a processor including hardware. The processor performs an information acquisition process of acquiring position information of a user wearing a head mounted display to cover his/her field of view; a virtual space setting process of setting a virtual space where a moving body corresponding to the user is arranged and set based on the acquired position information; a moving body process of moving the moving body in the virtual space based on the acquired position information; and a display process of generating a display image on the head mounted display. In the virtual space setting process, the processor sets the virtual space such that a first moving body group and
(Continued)

a second moving body group are arranged and set in a common virtual field of the virtual space.

15 Claims, 24 Drawing Sheets

(51) Int. Cl.
    *A63F 13/212*     (2014.01)
    *A63F 13/213*     (2014.01)
    *A63F 13/285*     (2014.01)
    *A63F 13/847*     (2014.01)

(52) U.S. Cl.
    CPC .......... *A63F 13/213* (2014.09); *A63F 13/285* (2014.09); *A63F 13/847* (2014.09); *A63F 2300/6081* (2013.01); *A63F 2300/8076* (2013.01); *A63F 2300/8082* (2013.01)

(56) References Cited

U.S. PATENT DOCUMENTS

| | | | | |
|---|---|---|---|---|
| 8,469,824 | B1* | 6/2013 | Farley | A63F 13/213 463/53 |
| 8,825,187 | B1* | 9/2014 | Hamrick | A63F 13/00 700/94 |
| 8,920,172 | B1* | 12/2014 | Wilmink | G09B 9/003 434/19 |
| 8,951,128 | B1* | 2/2015 | Farley | A63F 13/213 463/51 |
| 9,132,342 | B2* | 9/2015 | Balachandreswaran | A63F 13/323 |
| 9,159,152 | B1* | 10/2015 | Glover | A63F 13/42 |
| 9,223,786 | B1* | 12/2015 | Hamrick | A63F 13/60 |
| 9,311,742 | B1* | 4/2016 | Glover | G06T 19/003 |
| 9,443,352 | B1* | 9/2016 | Glover | A63F 13/00 |
| 9,677,840 | B2* | 6/2017 | Rublowsky | G09G 3/2003 |
| 9,754,167 | B1* | 9/2017 | Holz | G06K 9/00355 |
| 9,858,643 | B2 | 1/2018 | Nishimaki et al. | |
| 9,898,864 | B2* | 2/2018 | Shapira | G06F 3/011 |
| 10,421,012 | B2* | 9/2019 | Vandonkelaar | A63F 13/352 |
| 10,430,646 | B2* | 10/2019 | Vandonkelaar | A63F 13/31 |
| 10,445,925 | B2* | 10/2019 | Tokubo | A63F 13/56 |
| 10,486,061 | B2* | 11/2019 | Vandonkelaar | G06T 7/292 |
| 2005/0049022 | A1* | 3/2005 | Mullen | A63F 13/42 463/1 |
| 2009/0278917 | A1* | 11/2009 | Dobbins | G06F 3/011 348/53 |
| 2013/0093788 | A1* | 4/2013 | Liu | H04N 5/272 345/633 |
| 2014/0198017 | A1* | 7/2014 | Lamb | G02B 27/017 345/8 |
| 2014/0287806 | A1* | 9/2014 | Balachandreswaran | A63F 13/212 463/7 |
| 2015/0097719 | A1* | 4/2015 | Balachandreswaran | A63F 13/5255 342/147 |
| 2015/0260474 | A1* | 9/2015 | Rublowsky | A63F 13/213 434/16 |
| 2015/0265920 | A1* | 9/2015 | Kim | G06T 7/251 463/31 |
| 2016/0171771 | A1* | 6/2016 | Pedrotti | G02B 27/017 345/633 |
| 2016/0260260 | A1* | 9/2016 | Fei | G06F 3/012 |
| 2017/0249822 | A1* | 8/2017 | Kotoyori | G08B 21/0446 |
| 2017/0319956 | A1* | 11/2017 | Vandonkelaar | G06K 9/4652 |
| 2017/0323451 | A1* | 11/2017 | Luo | G06T 7/207 |
| 2018/0276891 | A1* | 9/2018 | Craner | G06T 19/20 |
| 2019/0089817 | A1* | 3/2019 | Gulbay | H04L 67/18 |
| 2019/0143223 | A1* | 5/2019 | Tamiya | G02B 27/0172 463/31 |

FOREIGN PATENT DOCUMENTS

| | | |
|---|---|---|
| JP | 2002-149581 A | 5/2002 |
| JP | 2016-48534 A | 4/2016 |
| JP | 2016-062486 A | 4/2016 |

* cited by examiner

FIG. 17
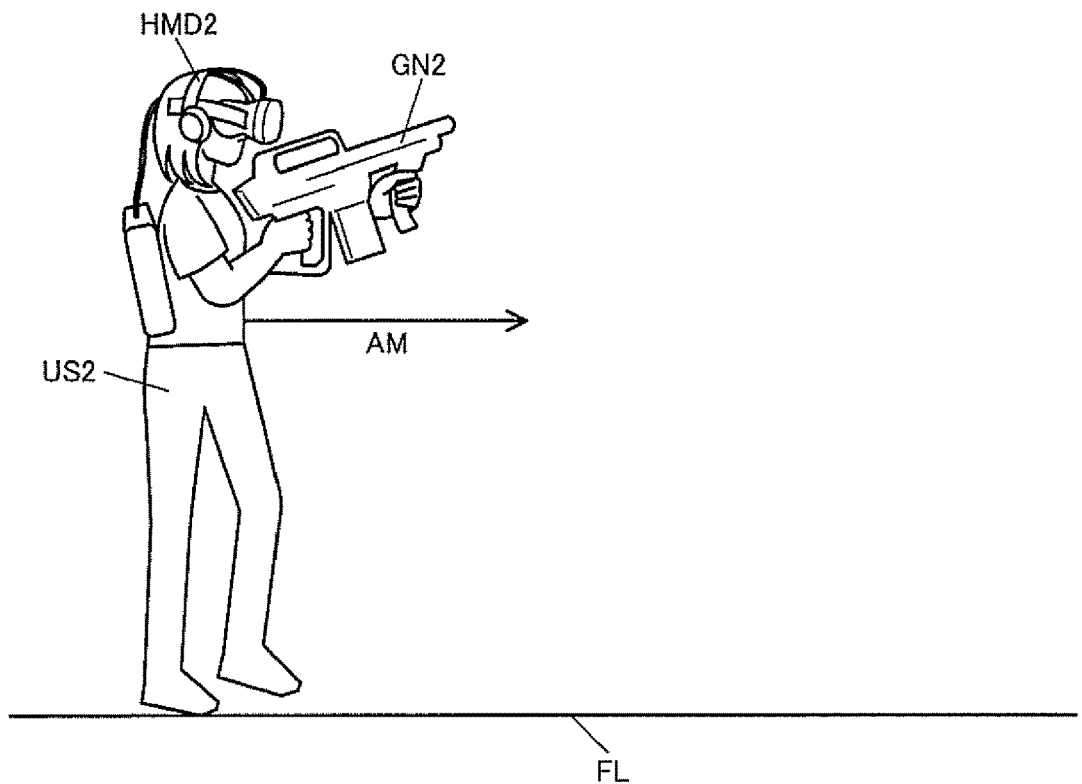
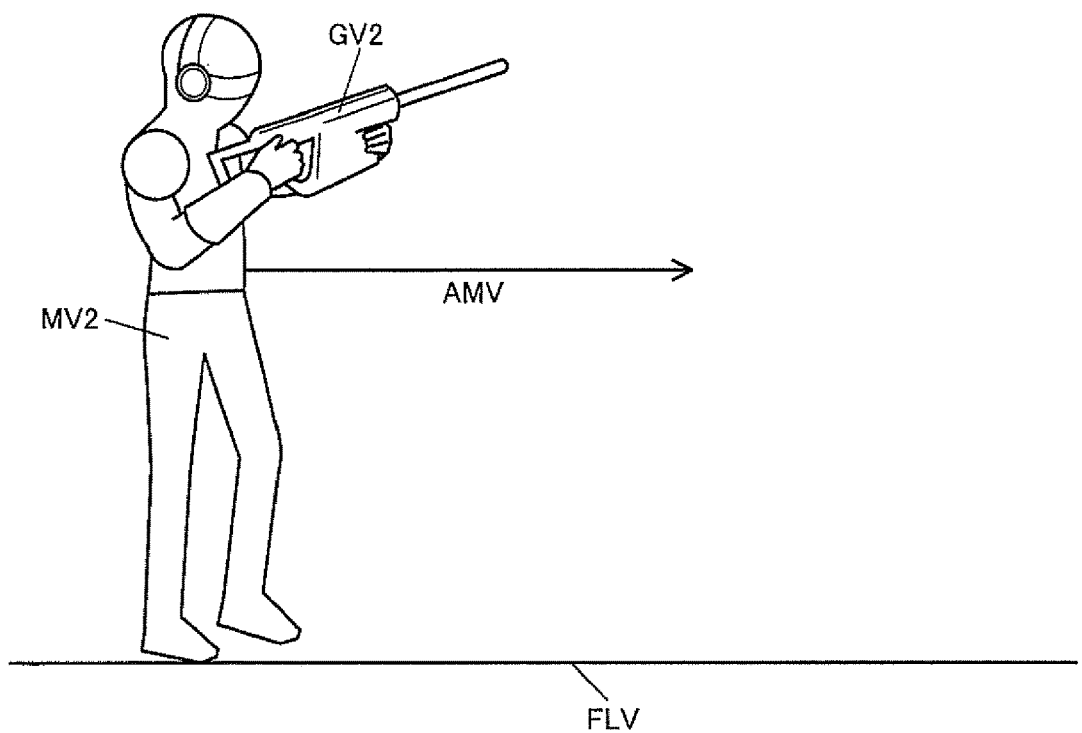

FIG. 19
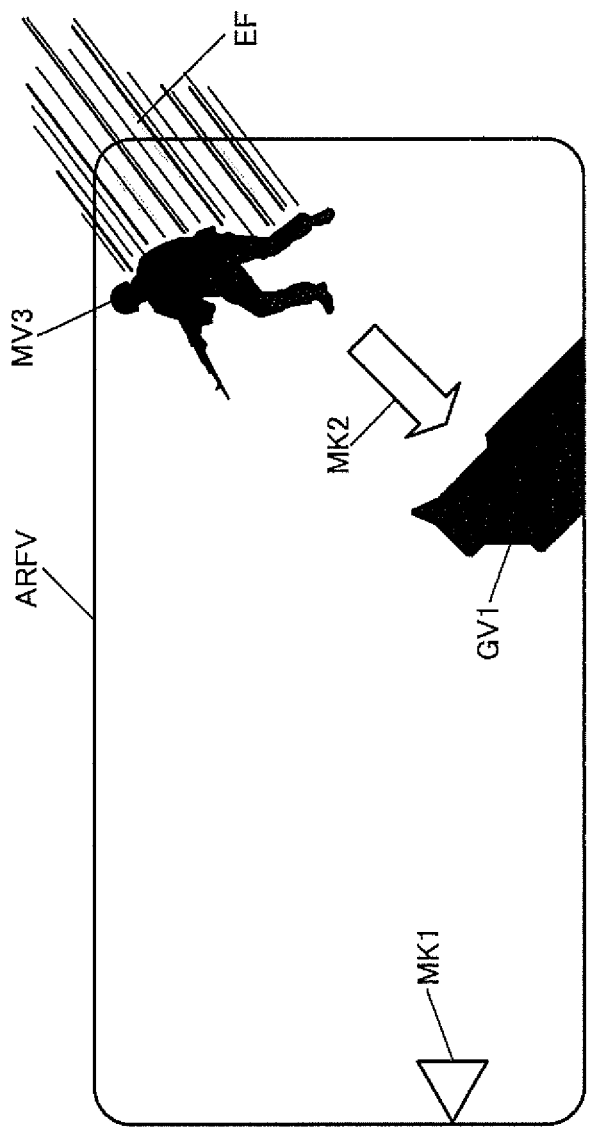

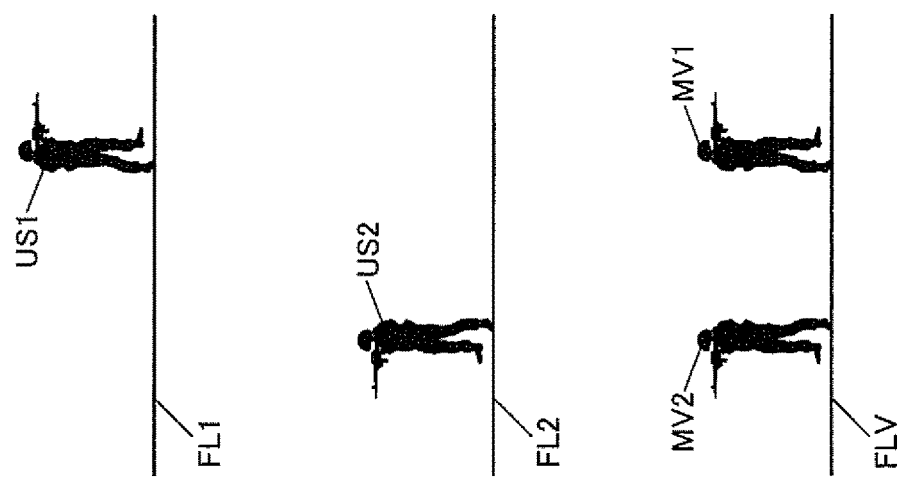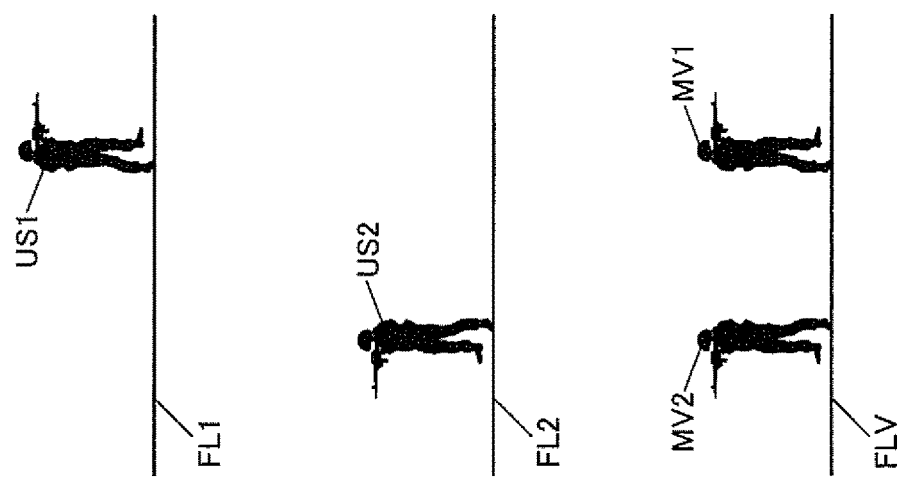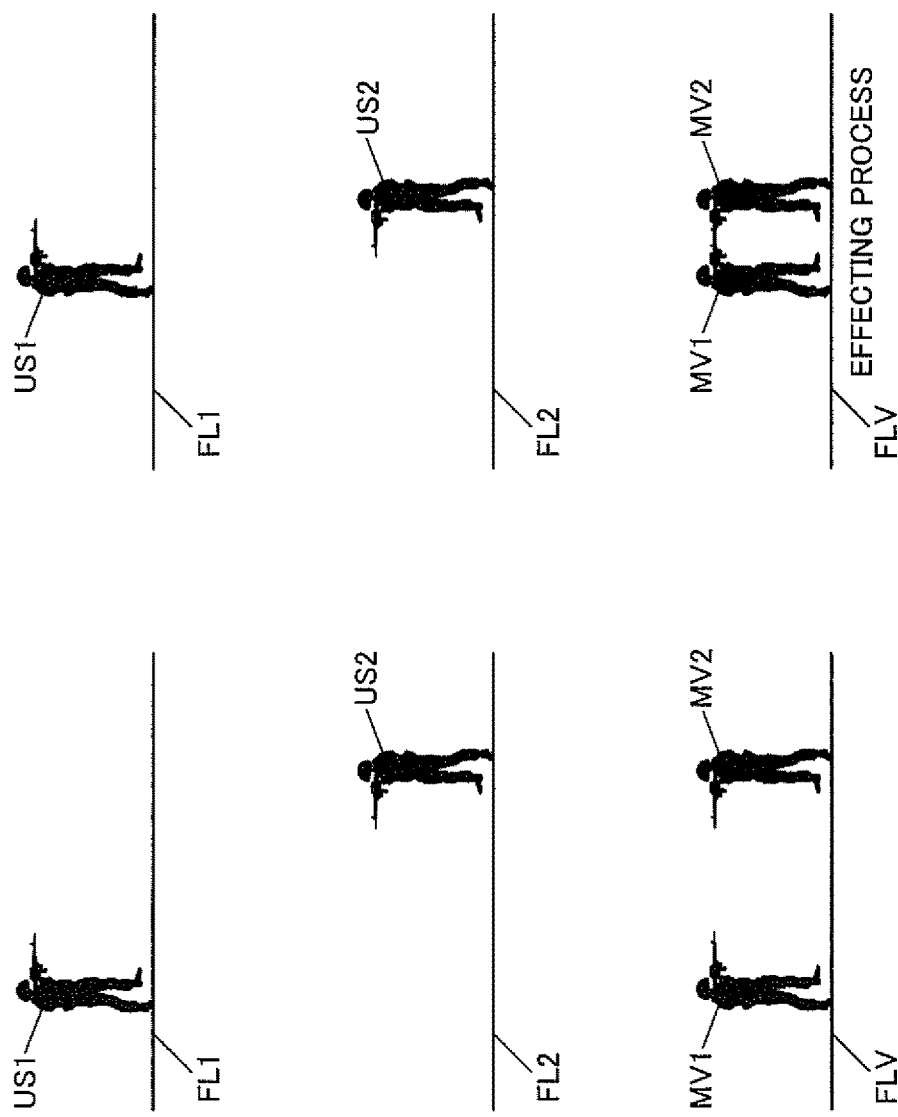

SIMULATION SYSTEM, PROCESSING METHOD, AND INFORMATION STORAGE MEDIUM

CROSS REFERENCE TO RELATED APPLICATION

This application is a continuation of International Patent Application No. PCT/JP2017/040957, having an international filing date of Nov. 14, 2017, which designated the United States, the entirety of which is incorporated herein by reference. Japanese Patent Application No. 2016-225408 filed on Nov. 18, 2016 is also incorporated herein by reference in its entirety.

BACKGROUND

The disclosure relates to a simulation system, a processing method, an information storage medium, and the like.

Simulation systems using head mounted displays (HMDs) have conventionally been known. The system enables a user wearing the HMD on his or her head to experience a virtual reality (VR) world by watching an image displayed on a screen of the HMD. Japanese Patent Application Publication No. H11-309269 discloses an example of a conventional technique of such a simulation system.

In the simulation system using an HMD, an image as viewed from a virtual camera in a virtual space is displayed on the HMD. With such an image displayed on the HMD, a vast VR space spreads over the entire field of view of a user, whereby virtual reality for the user can be largely improved.

However, when putting the HMD on his/her head, the user may not see anything around him/her or may have great difficulty in seeing things around him/her. In such an event, users may collide with each other or a user's equipment may collide with another user.

BRIEF DESCRIPTION OF THE DRAWINGS

FIG. 17 is a diagram illustrating a method for causing a difference between a movement amount of a user in a real space and a movement amount of a moving body in a virtual space.

FIG. 19 is a diagram illustrating a method for adding an effect and displaying various markers.

FIG. 21A to FIG. 21C are diagrams illustrating an effecting process to be performed when a moving body and another moving body have come into a proximity relationship.

DESCRIPTION OF EXEMPLARY EMBODIMENTS

Figure 1:
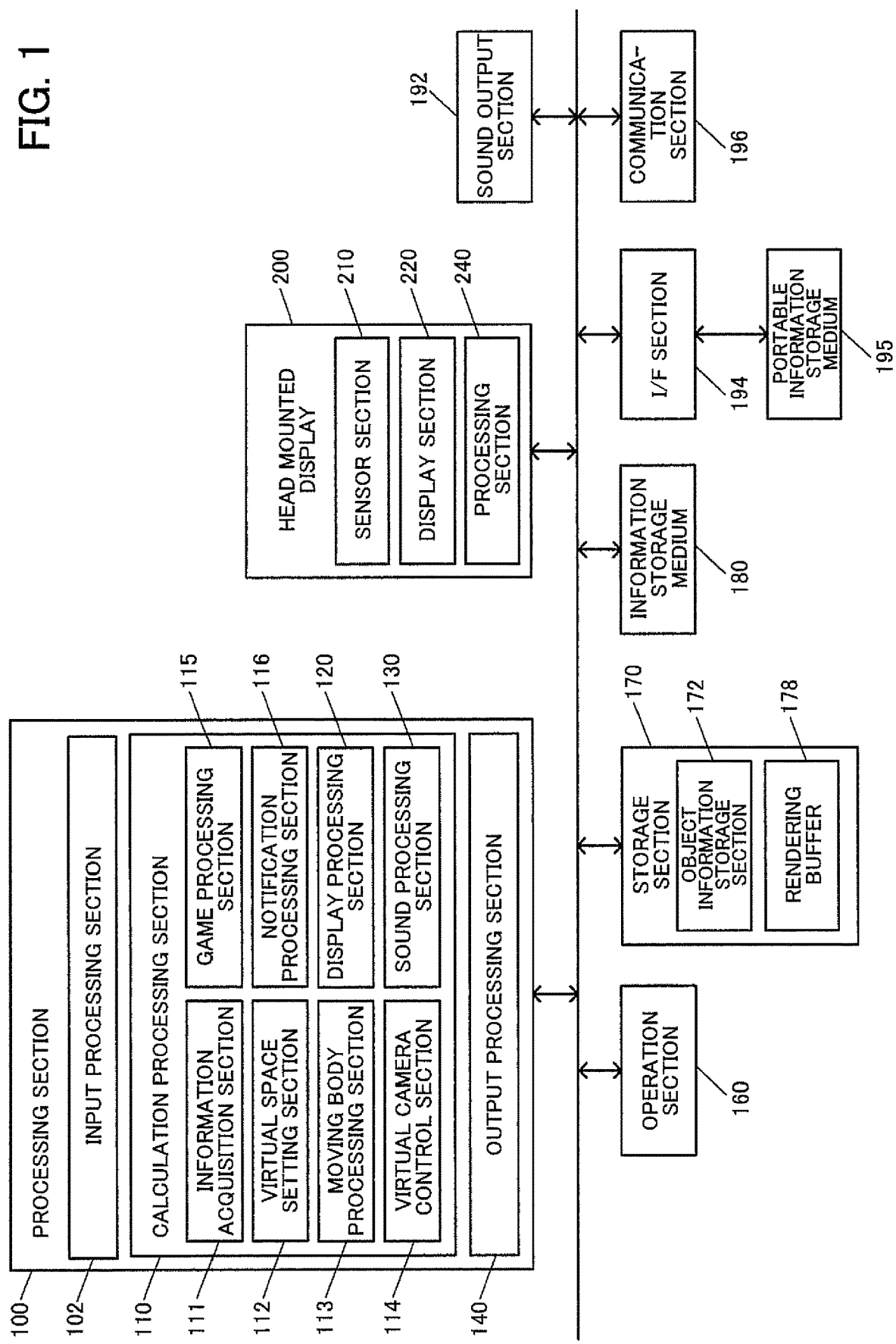
FIG. 1 is a block diagram illustrating a configuration example of a simulation system according to the present embodiment.

The following disclosure provides various different embodiments and examples to embody different features of the presented subject matters. These are apparently provided for illustrative purposes only and are not intended to be construed in a limiting sense. The present disclosure may include repeated use of reference numerals and/or characters in various examples. Such repetitions are provided for a concise and clear description, and do not simply require any relation with various embodiments and/or configurations described. Furthermore, a description of a first element "connected" or "coupled" to a second element includes some embodiments in which the first element is directly connected or coupled to the second element and other embodiments in which the first element is indirectly connected or coupled to the second element with one or more other elements interposed therebetween.

Exemplary embodiments are described below. Note that the following exemplary embodiments do not in any way limit the scope of the content defined by the claims laid out herein. Note also that all of the elements described in the present embodiment should not necessarily be taken as essential elements.

1. Simulation System

FIG. 1 is a block diagram illustrating a configuration example of a simulation system (a simulator, a game system) according to the present embodiment. The simulation system according to the present embodiment is a system that simulates Virtual Reality (VR) for example, and can be applied to various systems such as a game system providing game contents, a real-time simulation system including a sports event simulator and a driving simulator, a system providing SNS service, a content providing system that provides a content such as a movie, or an operating system for implementing a remote controlled operation. The simulation system according to the present embodiment is not limited to the configuration illustrated in FIG. 1, and can be modified in various ways including omitting some of its components (sections) or adding another component.

An operation section 160 is used by a user (player) to input various types of operation information (input information). The operation section 160 can be implemented by various operation devices such as an operation button, a direction designating key, a joystick, a handle, a pedal, and a lever for example. For example, the operation section 160 can be implemented by a controller like a gun-shaped controller as a user's equipment.

A storage section 170 stores therein various types of information. The storage section 170 functions as a work area for a processing section 100, a communication section 196, and the like. The storage section 170 stores therein a game program and game data required for executing the game program. The function of the storage section 170 can be implemented by a semiconductor memory (dynamic random access memory (DRAM), video RAM (VRAM)), a hard disk drive (HDD), a solid state drive (SSD), an optical disc device, or the like. The storage section 170 includes an object information storage section 172 and a rendering buffer 178.

An information storage medium 180 (computer-readable medium) stores therein a program, data, and the like. The function of the information storage medium 180 can be implemented by an optical disc (a digital versatile disc (DVD), a Blu-ray disc (BD), a compact disc (CD)), an HDD, a semiconductor memory (read only memory (ROM)), and the like. The processing section 100 performs various processes according to the present embodiment based on a program (data) stored in the information storage medium 180. Thus, the information storage medium 180 stores therein a program for causing a computer (a device including an input device, the processing section, the storage section, and an output section) to function as the sections according to the present embodiment (a program for causing a computer to perform processes of the sections).

A head mounted display (HMD) 200 is a device that is worn on the head of the user, and displays an image in front of the eyes of the user. The HMD 200 is preferably a non-transparent type, but may also be a transparent type. The HMD 200 may be what can be referred to as an eye-piece type HMD.

The HMD 200 includes a sensor section 210, a display section 220, and a processing section 240. A modification where the HMD 200 is provided with a light emitting element may be employed. The sensor section 210 implements a tracking process such as head tracking for example. For example, the position and the direction of the HMD 200 are identified through the tracking process performed with the sensor section 210. With the position and the direction of the HMD 200 thus identified, a point-of-view position and a line-of-sight direction of the user can be identified.

Various tracking schemes can be employed. For a first tracking scheme as an example of the tracking scheme, a plurality of light receiving elements (such as photodiodes) are provided as the sensor section 210, as will be described in detail later with reference to FIG. 2A and FIG. 2B. With the plurality of light receiving elements receiving light (such as a laser beam) from a light emitting element (such as a light emitting diode (LED)) provided outside, a position and a direction of the HMD 200 (the head of the user) in a three-dimensional space of the real world are identified. For a second tracking scheme, the HMD 200 is provided with a plurality of light emitting elements (LEDs) as will be described in detail later with reference to FIG. 3A and FIG. 3B. The position and the direction of the HMD 200 are identified with an external image capturing section capturing an image with light from the plurality of light emitting elements. A third tracking scheme uses a motion sensor, provided to the sensor section 210, to identify the position and the direction of the HMD 200. For example, the motion sensor can be implemented with an acceleration sensor, a gyro sensor, or the like. For example, the position and the direction of the HMD 200 in the three-dimensional space in the real world can be identified with a 6-axis motion sensor including a 3-axis acceleration sensor and a 3-axis gyro sensor. The position and the direction of the HMD 200 may be identified with a combination of the first tracking scheme and the second tracking scheme, or a combination of the first tracking scheme and the third tracking scheme. A tracking process of directly identifying the point-of-view position and line-of-sight direction of the user, instead of identifying the position and the direction of the HMD 200 to identify the point-of-view position and line-of-sight direction of the user, may be employed.

For example, the display section 220 of the HMD 200 can be implemented with an organic electroluminescence display (OEL), a liquid crystal display (LCD), or the like. For example, the display section 220 of the HMD 200 is provided with a first display or a first display area set to be in front of the left eye of the user, and a second display or a second display area set to be in front of the right eye of the user, whereby stereoscopic view can be provided. The stereoscopic view is implemented with left-eye and right-eye images, with parallax, generated to be respectively displayed on the first and the second displays. Alternatively, the left-eye image and the right-eye image are respectively displayed on the first and the second display areas of a single display. The HMD 200 is provided with two eyepieces (fish-eye lenses) for the left-eye and the right-eye so that a VR space can be provided entirely over the field of view of the user. A correction process is performed for the left-eye image and the right-eye image to correct distortion produced in an optical system such as the eyepiece. This correction process is performed by a display processing section 120.

The processing section 240 of the HMD 200 performs various processes required in the HMD 200. For example, the processing section 240 performs a control process for the sensor section 210, a display control process for the display section 220, or the like. The processing section 240 may perform a three-dimensional acoustic (stereophonic sound) process to simulate direction, distance and spreading of sound in three dimensions.

A sound output section 192 outputs sound generated in accordance with the present embodiment, and can be implemented by a speaker, a headphone, or the like.

An interface (I/F) section 194 performs an interface process for a portable information storage medium 195. The function of the I/F section 194 can be implemented with an application specific integrated circuit (ASIC) for the I/F process. The portable information storage medium 195 is a storage device that stores therein various types of information from the user, and holds the information without power supply. The portable information storage medium 195 can be implemented with an integrated circuit (IC) card (memory card), a universal serial bus (USB) memory, a magnetic card, or the like.

The communication section 196 communicates with external apparatuses (other devices) through a wired or wireless network. The function of the communication section 196 can be implemented with a communication ASIC, hardware such as a communication processor, or a communication firmware.

The program (data) for causing a computer to function as the sections according to the present embodiment may be distributed to the information storage medium 180 (or the storage section 170) from an information storage medium of a server (host device) through a network and the communication section 196. The scope of the present disclosure can include such a configuration where the information storage medium of the server (host device) is used.

The processing section 100 (processor) performs a game process (simulation process), a virtual space setting process, a moving body process, a virtual camera control process, a display process, or sound process based on operation information from the operation section 160, tracking information about the HMD 200 (information about at least one of the position and direction of the HMD, information about at least one of the point-of-view position and the line-of-sight direction), a program, and the like.

Processes (functions) according to the present embodiment performed by sections of the processing section 100 can be implemented by a processor (processor including hardware). For example, the processes according to the present embodiment can be implemented by a processor that operates based on information such as a program and a memory that stores therein the information such as the program. For example, the processor may implement the functions of the sections in discrete hardware or in integrated hardware. For example, the processor may include hardware, and the hardware may include at least one of a circuit that processes a digital signal and a circuit that processes an analog signal. For example, the processor may include one or a plurality of circuit devices (such as an integrated circuit (IC) for example) or one or a plurality of circuit elements (such as a resistor and a capacitor for example) mounted on a circuit board. For example, the processor may be a central processing unit (CPU). However, the processor is not limited to the CPU, and various processors such as a graphics processing unit (GPU) or a digital signal processor (DSP) may be used. The processor may be a hardware circuit such as an ASIC. The processor may include an amplifier circuit, a filter circuit, or the like that processes an analog signal. The memory (storage section 170) may be a semiconductor memory such as a static random access memory (SRAM) and a DRAM or may be a resistor. Furthermore, the memory may be a magnetic storage device such as a hard disk device (HDD) or may be an optical storage device such as an optical disc device. For example, the memory stores therein a computer-readable command, and the processes (functions) of the sections of the processing section 100 are implemented with the processor executing the command. This command may be a set of commands forming a program, or may be a command for instructing an operation to a hardware circuit of the processor.

The processing section 100 includes an input processing section 102, a calculation processing section 110, and an output processing section 140. The calculation processing section 110 includes an information acquisition section 111, a virtual space setting section 112, a moving body processing section 113, a virtual camera control section 114, a game processing section 115, a notification processing section 116, a display processing section 120, and a sound processing section 130. As described above, the processes according to the present embodiment performed by these sections may be implemented by a processor (or a processor and a memory). Various modifications may be made with some of these components (sections) omitted, or another component added.

The input processing section 102 performs an input process including: a process of receiving operation information or tracking information; a process of reading information from the storage section 170; and a process of receiving information through the communication section 196. For example, the input processing section 102 performs an input process including: a process of acquiring operation information input by a user by using the operation section 160 and tracking information detected by the sensor section 210 of the HMD 200; a process of reading information, designated with a read command, from the storage section 170; and a process of receiving information from an external apparatus (such as a server) through a network. The receiving process includes a process of instructing the communication section 196 to receive information, acquiring the information received by the communication section 196, and writing the information to the storage section 170.

For example, the calculation processing section 110 performs various calculation processes. For example, the calculation processing section 110 performs calculation processes such as an information acquisition process, a virtual space setting process, a moving body process, a virtual camera control process, a game process (simulation process), a notification process, a display process, and a sound process.

The information acquisition section 111 (a program module for an information acquisition process) performs an acquiring process for various types of information. For example, the information acquisition section 111 acquires position information about the user wearing the HMD 200. The information acquisition section 111 may also acquire direction information about the user.

The virtual space setting section 112 (a program module for a virtual space setting process) performs a setting process for a virtual space (object space) where a plurality of objects is arranged. For example, a process of setting an arrangement of various objects (an object formed by a primitive surface such as a polygon, a free-form surface or a subdivision surface) representing various display objects such as a moving body (such as a person, a robot, a car, a train, an aircraft, a boat, a monster, or an animal), a map (terrain), a building, audience seats, a course (road), woods, a wall, and a water surface in the virtual space is performed. Specifically, a position and a rotational angle (that is the same as an orientation or a direction) of an object in a world coordinate system are determined, and the object is arranged at the position (X, Y, Z) at the rotational angle (rotational angles about X, Y, and Z axes). Thus, the object information storage section 172 of the storage section 170 stores object information in association with an object number. The object information includes information about a position, rotational angle, a movement speed, a moving direction, and the like of an object (part object) in the virtual space. Examples of the process performed by the virtual space setting section 112 include updating the object information by a frame by frame basis.

The moving body processing section 113 (a program module for a moving body process) performs various processes for a moving body that moves in a virtual space. For example, a process of moving the moving body in a virtual space (object space or game space) or a process of causing the moving body to make an action is performed. For example, the moving body processing section 113 performs a control process based on the operation information input by the user using the operation section 160, tracking information acquired, a program (movement/operation algorithm), and various types of data (motion data), and the like. The control process includes moving the moving body (model object) in the virtual space and causing the moving body to make an action (motion, animation). Specifically, a simulation process is performed to sequentially obtain movement information (position, rotational angle, speed, or acceleration) and action information (a position and a rotational angle of a part object) of the moving body on a frame (for example, 1/60 seconds) by frame basis. The frame is a unit of time for performing a movement/action process (simulation process) of the moving body and an image generation process. For example, the moving body is a virtual user (virtual player or avatar) in a virtual space corresponding to the user (player) in the real space or a ridden moving body (operated moving body) ridden (operated) by the virtual user.

The game processing section 115 (a program module for a game process) performs various game processes for the user to play the game. In other words, the game processing section 115 (simulation processing section) performs various simulation processes to enable the user to experience virtual reality. Examples of the game process include a process of starting the game when a game start condition is satisfied, a process of making the started game progress, a process of ending the game when a game end condition is satisfied, and a process of calculating a game result.

The notification processing section 116 (a program module for a notification process) performs various notification processes. Examples of the notification process include a warning to the user. For example, the notification process may be performed by using an image and sound, or may be performed by using a vibration device or a sensation device utilizing sound, an air gun, or the like.

The display processing section 120 (a program module for a display process) performs a display process for a game image (simulation image). For example, a rendering process is performed based on results of various processes (a game process, a simulation process) performed by the processing section 100 to generate an image, and the image is displayed on the display section 220 of the HMD 200. Specifically, a geometry process such as coordinate transformation (world coordinate transformation, camera coordinate transformation), a clipping process, a perspective transformation, or a light source process is performed. Rendering data (coordinates of the vertex position of the primitive surface, texture coordinates, color data, a normal vector, an a value, or the like) is generated based on a result of the process. An object (one or a plurality of primitive surfaces) after the perspective transformation (after the geometry process) is rendered in the rendering buffer 178 (a frame buffer, a work buffer or the like that can store image information in a unit of pixels), based on the rendering data (primitive surface data). Thus, an image in the object space (virtual space) as viewed from the virtual camera (a given point-of-view, a left-eye, right-eye, first, or second point-of-view) is generated. The rendering process performed by the display processing section 120 can be implemented with a vertex shader process, a pixel shader process, or the like.

The sound processing section 130 (a program module for sound process) performs a sound process based on a result of various processes performed by the processing section 100. Specifically, game sound such as a song (music, background music (BGM)), a sound effect, or a voice is generated to be output by the sound output section 192. A part (three-dimensional acoustic process for example) of the sound process performed by the sound processing section 130 may be implemented by the processing section 240 of the HMD 200.

The output processing section 140 performs an output process of outputting various types of information. For example, the output processing section 140 performs the output process including: a process of writing information to the storage section 170; and a process of transmitting information through the communication section 196. For example, the output processing section 140 performs a process of writing information, designated by a write command, to the storage section 170, and a process of transmitting information to an external apparatus (such as a server) through a network. This transmission process is a process of instructing the communication section 196 to transmit information, and a process of designating the information to be transmitted to the communication section 196.

The simulation system according to the present embodiment includes the information acquisition section 111, the virtual space setting section 112, the moving body processing section 113, and the display processing section 120, as illustrated in FIG. 1.

The information acquisition section 111 acquires position information on the user wearing the HMD 200 in such a manner as to interrupt his/her field of view, for example. For example, the information acquisition section 111 acquires the position information on the user in the real space based on tracking information on the HMD 200. For example, the information acquisition section 111 acquires the position information on the HMD 200 as the position information on the user wearing the HMD 200. Specifically, when the user is positioned in a field (a play field, a simulation field, or a play area) in a real space (real world), the information acquisition section 111 acquires the position information on the user in the field (position coordinates in a coordinate system with an origin point at a given position).

The virtual space setting section 112 performs a setting process of a virtual space in which a moving body corresponding to the user is arranged and set based on the acquired position information. For example, the virtual space setting section 112 performs a process of setting position and direction of the moving body and arranging the moving body in the virtual space. Specifically, the virtual space setting section 112 arranges the moving body corresponding to the user in the virtual space at a position corresponding to a position of the user in the real space. The information on the position and direction of the moving body as an object is stored in the object information storage section 172, for example. The moving body is an object (display object) that moves in the virtual space (object space) following the movement of the user in the real space, for example. The moving body is a ridden moving body or the like on which a virtual user (avatar) corresponding to the user or the user rides, for example.

The moving body processing section 113 performs a process of moving the moving body in the virtual space based on the acquired position information. For example, the moving body processing section 113 moves the moving body in the virtual space to follow the movement of the user in the real space according to the position information of the user. For example, the moving body processing section 113 performs a process of updating the position or the like of the moving body in each frame based on a movement speed or movement acceleration of the moving body, thereby to move the moving body in the virtual space (virtual field).

The display processing section 120 generates a display image on the HMD 200 worn by the user. For example, the display processing section 120 generates an image seen from the virtual camera in the virtual space as a display image on the HMD 200. For example, the virtual camera control section 114 performs a control process of the virtual camera corresponding to the point-of-view of the user wearing the HMD 200. For example, the virtual camera control section 114 controls the virtual camera set as a first person point-of-view of the user. For example, the virtual camera is set to be at a position corresponding to the point-of-view of a moving body (virtual player or the like) moving in the virtual space, and the point-of-view position and the line-of-sight direction of the virtual camera are set to control the position (position coordinates) and the orientation (a rotational angle about a rotation axis) of the virtual camera. The display processing section 120 then generates an image as viewed from the virtual camera (user point-of-view) in the virtual space as a display image (display video) of the HMD 200. For example, an image as viewed from a given point-of-view in the object space as the virtual space is generated. The generated image is a stereoscopic image, for example.

In the present embodiment, the virtual space setting section 112 performs a setting process of a virtual space such that a first moving body group corresponding to a first user group positioned in a first field of the real space and a second moving body group corresponding to a second user group positioned in a second field of the real space are arranged and set in a common virtual field (the same virtual field) of the virtual space. The second field is a field different from the first field, for example.

Specifically, in the simulation system of the present embodiment, there are prepared the first field in which the first user group is movable and the second field in which the second user group is movable. Alternatively, three or more fields including a third field in which a third user group is movable may be prepared. These fields are provided in a facility where the simulation system is operated, for example. The fields may be provided in a place other than a facility (for example, garden, house, or the like). Each of the first and second user groups is a group (team) consisting of at least one user, for example.

Appear in the virtual space are the first moving body group corresponding to the first user group in the first field and the second moving body group corresponding to the second user group in the second field. The moving bodies in the first and second moving body groups are moving bodies corresponding to the users in the first and second user groups, which are virtual users or ridden moving bodies (robots) corresponding to the users. These moving bodies wear outfits and equipment different from those of the users in the real space, for example.

The virtual space setting section 112 performs the setting process of the virtual space such that the first moving body group corresponding to the first user group and the second moving body group corresponding to the second user group are arranged and set in the common virtual field of the virtual space. For example, the virtual space setting section 112 arranges the moving bodies in the first moving body group corresponding to the users in the first user group at the positions in the virtual field corresponding to the positions of the users in the first field. The virtual space setting section 112 also arranges the moving bodies in the second moving body group corresponding to the users in the second user group at the positions in the virtual field corresponding to the positions of the users in the second field.

For example, position coordinates of each of the users in the first user group relative to a reference point (for example, an origin point) in the first field are set to PCD1 (X1, Y1). In this case, the virtual space setting section 112 arranges the moving bodies in the first moving group at the positions specified based on the reference point (for example, the origin point) in the virtual field and the relative position coordinates PCD1 (X1, Y1). In addition, the virtual space setting section 112 sets position coordinates of the users in the second user group relative to the reference point (for example, the origin point) in the second field as PCD2 (X2, Y2). In this case, the virtual space setting section 112 arranges the moving bodies in the second moving group at positions specified based on the reference point in the virtual field and the relative position coordinates PCD2 (X2, Y2). For example, it is assumed that the relative position coordinates of a first user in the first user group relative to the reference point in the first field and the position coordinates of the second user in the second user group relative to the reference point in the second field are the same. In this case, the first moving body corresponding to the first user and the second moving body corresponding to the second user are arranged at the same position in the common virtual field, for example.

The simulation system also includes the game processing section 115. The game processing section 115 performs a game process of a battle between users. Specifically, the game processing section 115 performs a game process of a battle between the first user group belonging to the first group (first team) and the second user group belonging to the second group (second team). For example, the moving body corresponding to the first user in the first user group is set as a first moving body, and the moving body corresponding to the second user in the second user group is set as a second moving body. In this case, the game processing section 115 performs a game process of a battle in which one of the first and second moving bodies attacks the other moving body or the one moving body defends against the other moving body's attack. The game process of a battle can be implemented by determining whether the one moving body's attack has hit the other moving body or whether the other moving body has defended against the one moving body's attack, for example. The game processing section 115 also performs a process of calculating game results of the battle game as a game process.

The simulation system also includes the sound processing section 130 that performs a process of generating sounds to be output to the users. The sound processing section 130 performs the process of generating sounds to be output to the users based on position information of the moving bodies in the virtual field of the virtual space. That is, the sound processing section 130 performs the process of generating sounds to be output to the users not using the position information of the users in the field of the real space, but using the position information of the moving bodies in the virtual field. For example, the sound processing section 130 performs a process of forming a sound field for performing the process of generating sounds to be output to the users. The sound processing section 130 performs the process of forming a sound field using the position information of the moving bodies in the virtual field of the virtual space. For example, since the first user group is located in the first field and the second user group is located in the second field, the first user in the first user group and the second user in the second user group are separated from each other in the real space. Also in this case, in the present embodiment, there occurs a situation in which the first moving body corresponding to the first user and the second moving body corresponding to the second user are in proximity to each other in the common virtual field. In the present embodiment, a first sound source to output the voice of the first user and the sounds made by attacks and movements of the first moving body is set at the position of the first moving body in the virtual space. In addition, a second sound source to output the voice of the second user and the sounds made by attacks and movements of the second moving body is set at the position of the second moving body in the virtual space. Therefore, even when the first and second users are separated from each other in the real space, the sounds from each other's counterpart sound source are heard from up close in the virtual space.

The simulation system also includes the notification processing section 116 that performs various notification processes for warning. For example, the notification processing section 116 performs a prediction process of a collision between users in the real space and performs a notification process for warning of a collision between users based on the result of the prediction process. For example, the notification processing section 116 performs the prediction process on whether users will come into a positional relationship of collision (proximity relationship). When the users have come into such a positional relationship, the notification processing section 116 performs the notification process for warning of the risk of a collision. The prediction process can be implemented by determining whether there is the risk of users coming into a positional relationship of collision based on the positions, speeds, or accelerations of the moving bodies corresponding to the users.

The notification processing section 116 performs a detection process of the motions of the users' equipment or the motions of the users in the real space. Then, the notification processing section 116 performs a notification process of warning of the motions of the equipment or the motions of the users based on the result of the detection process. The equipment includes items hand-held by the users, putting on the users' legs, trunks, or heads, or worn by the user, for example. The notification processing section 116 detects the motions of the users' equipment and the motions of the users, and performs a notification process of warning of the motions of the equipment and the motions of the users. For example, the notification processing section 116 detects whether the equipment or the users are vigorously moving based on the positions, speeds, or accelerations of the equipment or the users. When the motion speed or the motion amount of any of the equipment or the users is equal to or greater than a given threshold, the notification processing section 116 performs a notification process of warning of the motion.

The notification processing section 116 also performs a notification process on the condition that it is determined that a user and another user are in a proximity relationship based on the position information of the users. For example, it is determined that a user and another user are in the proximity relationship when the other user has entered a detection range (distance range) set for the user. The notification processing section 116 performs a notification process of warning on the condition that it is determined that a user and another user are in a proximity relationship. For example, in a state where a user and another user are not in a proximity relationship (a state where another user is located outside the detection range), even when the motion speed or the motion amount of any of the equipment or the users is equal to or greater than a threshold, the notification processing section 116 does not perform a notification process of warning of the motion.

The notification process of warning can be implemented by images displayed on the HMD 200, sounds output from a speaker installed in a headphone or a field, vibrations of a vibration device provided in equipment of the user such as weapons, clothes, or accessories, or various sensory mechanisms (sensory devices using light, vibration, air gun, or sound) provided in the field of the real space.

The moving body processing section 113 performs a process of moving any of the moving bodies in the virtual space by a movement amount different from the movement amount of the corresponding user in the real space. For example, the moving body processing section 113 moves any of the moving bodies in the virtual space by a larger movement amount than the movement amount of the corresponding user in the real space. Alternatively, the moving body processing section 113 may differentiate the scale of the users in the real space from the scale of the moving bodies in the virtual space. This suppresses a collision between users (for example, allied users). The movement amount indicates the degree of movement of the user or the moving body, which can be represented by the movement distance of the user or the moving body per unit time (frame), for example.

When it is determined that a user and another user have come into a proximity relationship in the real space, the moving body processing section 113 performs a movement process of accelerating the movement speed of another moving body corresponding to another user, accelerating the movement acceleration of the other moving body, or lengthening the movement distance of the other moving body. For example, the moving body processing section 113 accelerates the movement speed of another moving body corresponding to another user, accelerates the movement acceleration of the other moving body, or lengthens the movement distance of the other moving body when another user has entered the detection range (distance range) set for the user. Specifically, the moving body processing section 113 accelerates the movement speed of the moving body, accelerates the movement acceleration of the other moving body, or lengthens the movement distance of the other moving body as compared to a case in which another user is located outside the detection range. This suppresses a collision or the like between users (for example, allied users).

When a moving body corresponding to a user and another moving body corresponding to another user have come into a given positional relationship (for example, a proximity relationship), the display processing section 120 performs a generation process (display process) of an effected image according to the given positional relationship. For example, when a moving body and another moving body have come into a given positional relationship, the game processing section 115 performs a game effecting process according to the given positional relationship. The display processing section 120 performs a generation process of an effected image according to the effecting process by the game processing section 115. For example, the display processing section 120 displays the effected image that would not be displayed in a case where a moving body and another moving body are not in the given positional relationship, when a moving body and another moving body come into the given positional relationship. The given positional relationship is a proximity relationship between a moving body and another moving body, for example. Alternatively, the given positional relationship may be a relationship in which a moving body and another moving body face each other (in front of each other) or the like. For example, the given positional relationship may be a relationship between the line-of-sight direction of a moving body and the line-of-sight direction of another moving body.

Specifically, in a state where a user and another user in the real space are not in a proximity relationship, when a moving body and another moving body in the virtual space have come into the proximity relationship, the display processing section 120 performs a process of generating an effected image. For example, in a state where a user and another user are not in the proximity relationship, when a moving body and another moving body have come into the proximity relationship, the game processing section 115 performs a game effecting process corresponding to the proximity relationship. The display processing section 120 performs a generation process of an effected image according to the effecting process by the game processing section 115.

For example, the display processing section 120 performs a generation process of an effected image in which at least one of a moving body and another moving body makes special motions or a generation process of an effected image in which the game shifts to a special mode for the given positional relationship. For example, when data for special motions is stored in the storage section 170 in association with the positional relationship (proximity relationship) and a moving body and another moving body have come into the positional relationship, the display processing section 120 performs a reproduction process of data of the special motions. Then, the display processing section 120 generates an effected image in which at least one of a moving body and another moving body makes the special motions. When the special mode associated with the positional relationship (proximity relationship) is prepared and a moving body and another moving body have come into the positional relationship, the display processing section 120 shifts from the normal mode (normal game mode) to the special mode.

The virtual camera control section 114 controls the virtual camera to follow a change in the point-of-view of the user based on tracking information of the point-of-view information of the user.

For example, the input processing section 102 (input reception section) acquires tracking information of point-of-view information of the user wearing the HMD 200. For example, the input processing section 102 acquires tracking information (point-of-view tracking information) for point-of-view information that is at least one of the point-of-view position and the line-of-sight direction of the user. For example, the tracking information can be acquired by performing a tracking process for the HMD 200. The point-of-view position and the line-of-sight direction of the user may be directly acquired by the tracking process. For example, the tracking information may include at least one of change information (a value of change in the coordinates of the point-of-view position) about the point-of-view position from the initial point-of-view position of the user and change information (a value of change in the rotational angle about the rotation axis of the line-of-sight direction) of the line-of-sight direction from the initial line-of-sight direction of the user. Based on the change information about the point-of-view information included in such tracking information, the point-of-view position and/or the line-of-sight direction of the user (the information about the position and the orientation of the head of the user) can be identified.

The virtual camera control section 114 changes the point-of-view position and/or the line-of-sight direction of the virtual camera based on the acquired tracking information (information about at least one of the point-of-view position and the line-of-sight direction of the user). For example, the virtual camera control section 114 sets the virtual camera so that the point-of-view position/line-of-sight direction (position/orientation) of the virtual camera in the virtual space changes in accordance with the change in the point-of-view position/line-of-sight direction of the user in the real space. Thus, the virtual camera can be controlled to follow the change in the point-of-view of the user, based on the tracking information about the point-of-view information of the user.

In the present embodiment, a virtual reality simulation process is performed as a game process for the game played by the user. The virtual reality simulation process is a simulation process simulating a real space event in the virtual space, and is for enabling the user to virtually experience the event. For example, a process of moving the moving body such as a virtual user corresponding to the user in the real space or its ridden moving body in the virtual space is performed for enabling the user to experience a change in an environment or surroundings due to the movement.

A process performed by the simulation system according to the present embodiment illustrated in FIG. 1 can be implemented by a processing apparatus such as a personal computer (PC) installed in a facility, a processing apparatus worn by the user, or by processes performed by these processing apparatuses in cooperation. Alternatively, the process performed by the simulation system according to the present embodiment may be implemented by a server system and a terminal device. For example, the process may be implemented as a process performed by the server system and the terminal device in cooperation.

2. Tracking Process

Figure 2A:
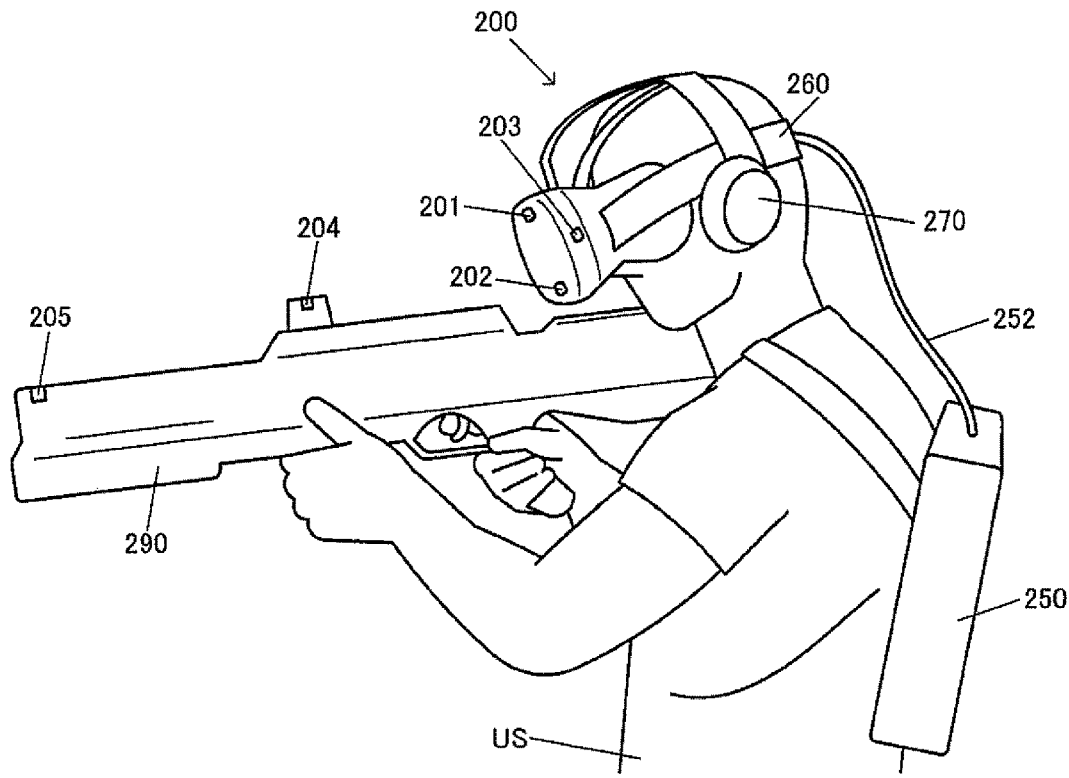
FIG. 2A and FIG. 2B illustrate an example of an HMD used in the present embodiment.

Next, an example of a tracking process will be described. FIG. 2A illustrates an example of the HMD 200 used in the simulation system in the present embodiment. As illustrated in FIG. 2A, the HMD 200 is provided with a plurality of light receiving elements (photodiodes) 201, 202, and 203. The light receiving elements 201 and 202 are provided on the front surface side of the HMD 200, whereas the light receiving element 203 is provided on the right side surface of the HMD 200. Note that unillustrated light receiving elements are further provided on the left side surface, the upper surface, or the like of the HMD.

A user US carries a gun-type controller 290 imitating a gun in the real world, which is also provided with light receiving elements 204 and 205 (photodiodes). Using the light receiving elements 204 and 205 makes it possible to specify the position and direction of the gun-type controller 290. The gun-type controller 290 has a gun-trigger switch that is operated so that the moving body in the virtual space fires a gun. The gun-type controller 290 may be provided with at least one light receiving element.

The HMD 200 is provided with a headband 260 and the like so that the user US can stably wear the HMD 200 on his or her head with a better fitting comfort. The HMD 200 is provided with an unillustrated headphone terminal. The user US can hear game sound as a result of a three-dimensional acoustic (three-dimensional audio) process for example, with a headphone 270 (sound output section 192) connected to the headphone terminal. The user US may be enabled to input operation information through a head nodding or shaking action of the user US to be detected by the sensor section 210 of the HMD 200 and the like.

The user US wears a processing apparatus 250 on his/her back, for example. For example, the user US wears a jacket with a back surface side to which the processing apparatus 250 is attached. For example, the processing apparatus 250 is implemented by an information processing apparatus such as a note PC. The processing apparatus 250 and the HMD 200 are connected together by a cable 252. For example, the processing apparatus 250 performs a generation process of an image (game image or the like) on the HMD 200 and sends data of the generated image to the HMD 200 via the cable 252, whereby the image is displayed on the HMD 200. Besides the image generation process, the processing apparatus 250 can perform various processes in the present embodiment (an information acquisition process, a virtual space setting process, a moving body process, a virtual camera control process, a game process, a notification process, a display process or a sound process, and others). The processes in the present embodiment may be implemented by a processing apparatus (not illustrated) such as a PC installed in a facility or may be implemented by a distributed process of the processing apparatus 250 attached to the user US.

Figure 2B:
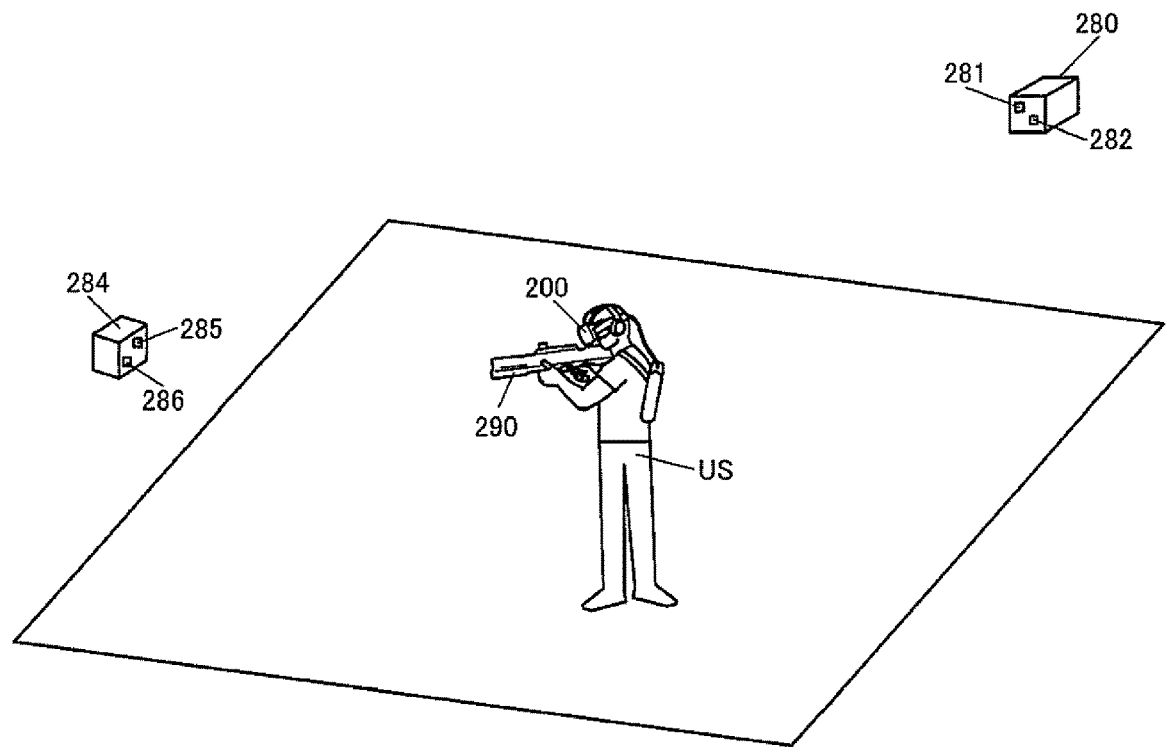

As illustrated in FIG. 2B, base stations 280 and 284 are installed in the periphery of the simulation system (movable chassis 40). The base station 280 is provided with light emitting elements 281 and 282, and the base station 284 is provided with light emitting elements 285 and 286. For example, the light emitting elements 281, 282, 285, and 286 are implemented with LEDs that emit laser beams (such as infrared laser beams). The base stations 280 and 284 radially emit laser beams by using the light emitting elements 281, 282, 285, and 286, for example. With the light receiving elements 201 to 203 provided to the HMD 200 in FIG. 2A and the like receiving the laser beams from the base stations 280 and 284, the tracking of the HMD 200 is implemented so that the position and the facing direction of the head of the user US (point-of-view position, line-of-sight direction) can be detected. The light receiving elements 204 and 205 provided in the gun-type controller 290 receive laser beams from the base stations 280 and 284, thereby making it possible to detect at least one of the position and direction of the gun-type controller 290.

Figure 3A:
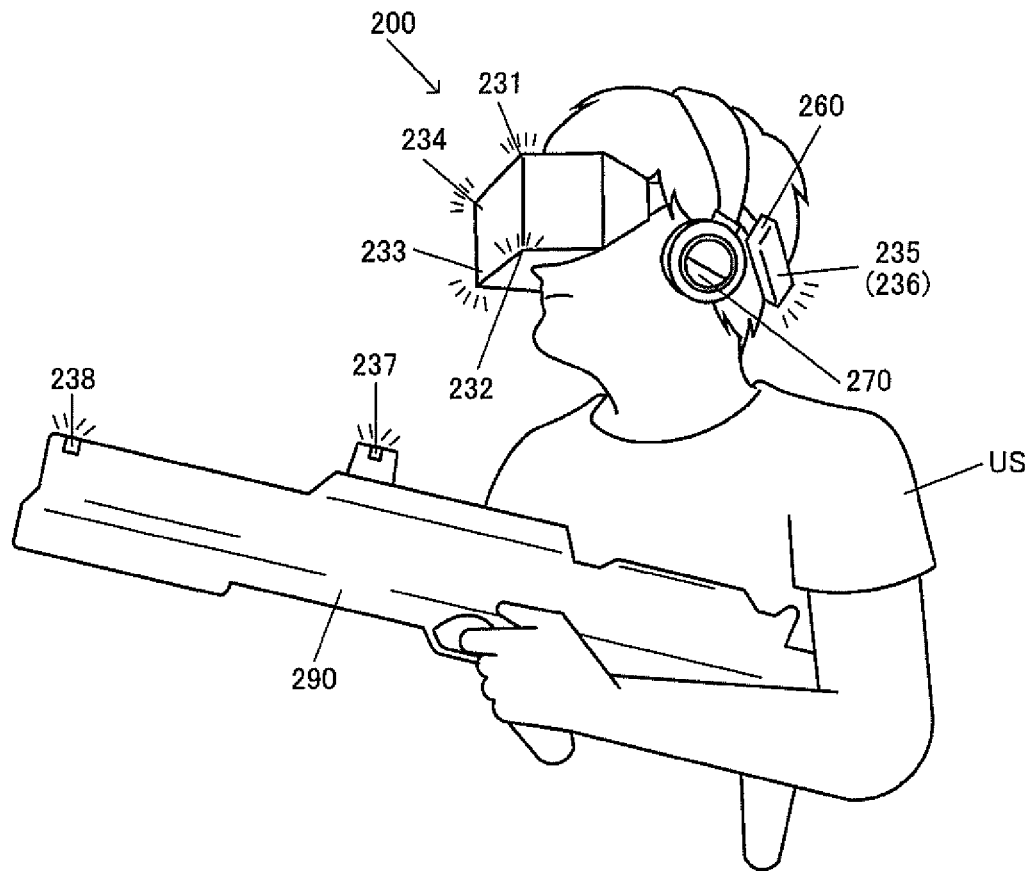
FIG. 3A and FIG. 3B illustrate another example of the HMD used in the present embodiment.

FIG. 3A illustrates another example of the HMD 200. The HMD 200 illustrated in FIG. 3A is provided with a plurality of light emitting elements 231 to 236. For example, these light emitting elements 231 to 236 are implemented with LEDs or the like. The light emitting elements 231 to 234 are provided on the front surface side of the HMD 200, and the light emitting element 235 and the light emitting element 236 (not illustrated) are provided on the back surface side. These light emitting elements 231 to 236 emit light in a wavelength band of visible light (light emission) for example. Specifically, the light emitting elements 231 to 236 emit light of colors different from each other. The gun-type controller 290 held by the user US is also provided with light emitting elements 237 and 238 (LEDs). The gun-type controller 290 may be provided with at least one light emitting element.

Figure 3B:
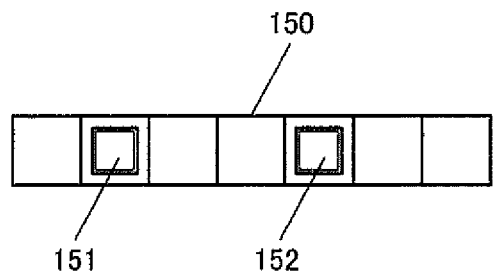

An image capturing section 150 illustrated in FIG. 3B is installed in at least one place around the user US (for example, front side or front side and back side) to capture images of light from the light emitting elements 231 to 236 of the HMD 200. Thus, the captured image obtained by the image capturing section 150 includes spots of the light from the light emitting elements 231 to 236. The head (HMD) of the user US is tracked with image processing executed on the captured image. Thus, the three-dimensional position and the facing direction of the head of the user US (the point-of-view position and the line-of-sight direction) are detected.

For example, as illustrated in FIG. 3B, the image capturing section 150 is provided with first and second cameras 151 and 152. The position of the head of the user US in a depth direction and the like can be detected by using first and second captured images respectively captured by the first and the second cameras 151 and 152. Based on motion detection information obtained by the motion sensor provided at the HMD 200, the rotational angle (line-of-sight) of the head of the user US can also be detected. Therefore, using the HMD 200 makes it possible to, even when the user US is oriented in any of all the 360-degree directions around the user US, display an image in the virtual space (virtual three-dimensional space) corresponding to the direction (seen from the virtual camera corresponding to the point-of-view of the user) on the display section 220 of the HMD 200.

The image capturing section 150 also captures images of the light from the light emitting elements 237 and 238 of the gun-type controller 290. That is, the image captured by the image capturing section 150 reflects spot light from the light emitting elements 237 and 238. Performing image processing on the captured images makes it possible to detect at least one of the position and direction of the gun-type controller 290 as in the case of the HMD 200.

LEDs emitting infrared light, instead of the visible light, may be used as the light emitting elements 231 to 238. Furthermore, another method such as one using a depth camera or the like may be employed to detect the position and/or movement of the head of the user and the like.

The tracking process for detecting the point-of-view position and/or line-of-sight direction (the position and/or direction of the user) of the user is not limited to the method described with reference to FIG. 2A to FIG. 3B. For example, the tracking process may be implemented solely by the HMD 200 by using the motion sensor and the like provided to the HMD 200. Specifically, the tracking process is implemented without providing external devices such as the base stations 280 and 284 in FIG. 2B, the image capturing section 150 in FIG. 3B, and the like. Alternatively, various point-of-view tracking processes such as known eye tracking, face tracking, or head tracking can be employed to detect the point-of-view information such as the point-of-view position and the line-of-sight direction or the like of the user.

The position and direction of the gun-type controller 290 may be detected by a motion sensor provided in the gun-type controller 290.

3. Method According to the Present Embodiment

Next, a method according to the present embodiment will be described in detail. The following description is given mainly based on an example where the method according to the present embodiment is applied to a battle game played by users in groups (teams). The present embodiment is not limited to this and can be applied to various games (a roll playing game (RPG), an action game, a racing game, a sport game, a thriller experience game, a simulation game for rides such as trains and aircrafts, a puzzle game, a communication game, or a music game) and to something other than games. In the example described below, the moving bodies are virtual users (characters) as the users' avatars. Alternatively, the moving bodies may be ridden moving bodies (for example, robots, combat vehicles, combat aircrafts, or automobiles) in which the users are to ride or the like.

3.1 Arrangement in the Common Virtual Field

Figure 4:
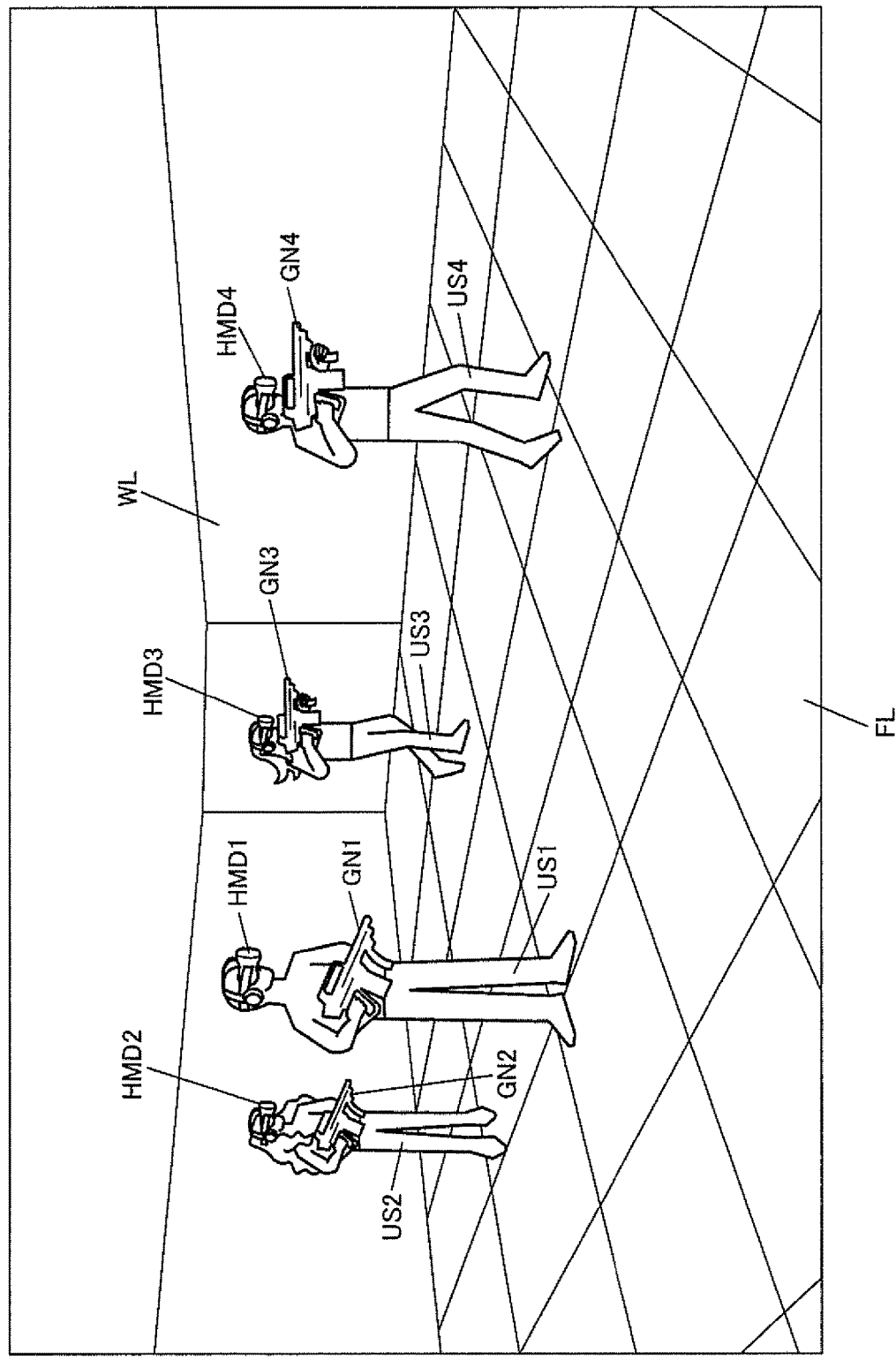
FIG. 4 is a diagram illustrating a field used in the simulation system.

FIG. 4 is a diagram illustrating a field used in the simulation system of the present embodiment. In the simulation system, a field FL (play field, play area, or play space) is prepared in a facility in the real world, and users US1 to US4 move in the field FL. The field FL is provided with partitions WL implemented by walls or the like.

The users US1 to US4 wear HMD1 to HMD4 and carry gun-type controllers GN1 to GN4 (broadly, controllers). The users US1 to US4 have the processing apparatuses 250 (not illustrated) as described above with reference to FIG. 2A attached to their backs, for example. The users US1 to US4 work in a team (broadly, group) for a team battle game, for example. The HMD1 to HMD4 reflect video in the virtual space so that the users US1 to US4 play a game such as a battle game while watching the video. When the HMD1 to HMD4 are non-transparent HMDs, for example, the users US1 to US4 have difficulty in seeing the situation in the real world because the fields of view of the users US1 to US4 are covered with the HMD1 to HMD4. This causes a problem that the user US2 behind the user S1 collides with the user US1, for example.

Figure 5A:
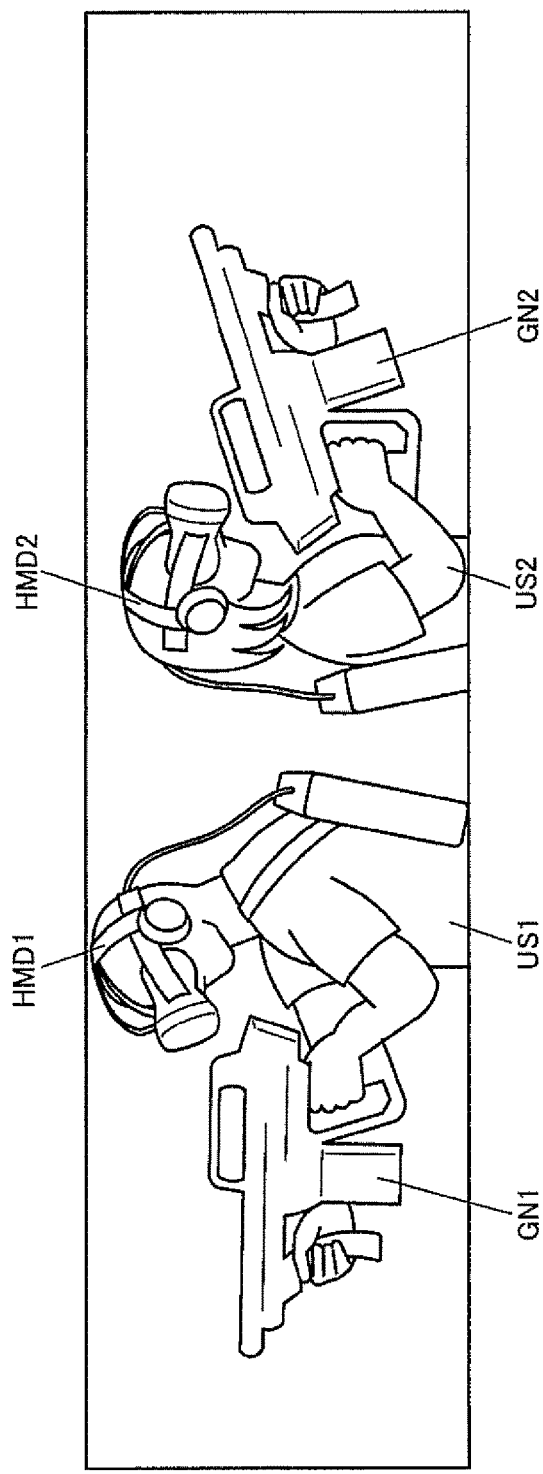
FIG. 5A and FIG. 5B are diagrams illustrating users in a real space and moving bodies corresponding to the users.

Before start of the gameplay, the users select moving bodies as their avatars. For example, FIG. 5A illustrates the users US1 and US2 in the real space (real world). The users US1 and US2 wear the HMD1 and HMD2 and carry gun-type controllers GN1 and GN2. Meanwhile, moving bodies MV1 and MV2 appear in the virtual space as avatars of the users US1 and US2. The moving bodies MV1 and MV2 wear the equipment and clothing of game characters. The moving bodies MV1 and MV2 carry guns GV1 and GV2 (gun display objects) corresponding to the gun-type controllers GN1 and GN2 in the real space. When the users US1 and US2 in the real space move the gun-type controllers GN1 and GN2 upward, downward, leftward, and rightward, the moving bodies MV1 and MV2 in the virtual space (virtual world) also move the guns GV1 and GV2 upward, downward, leftward, and rightward.

Figure 6A:
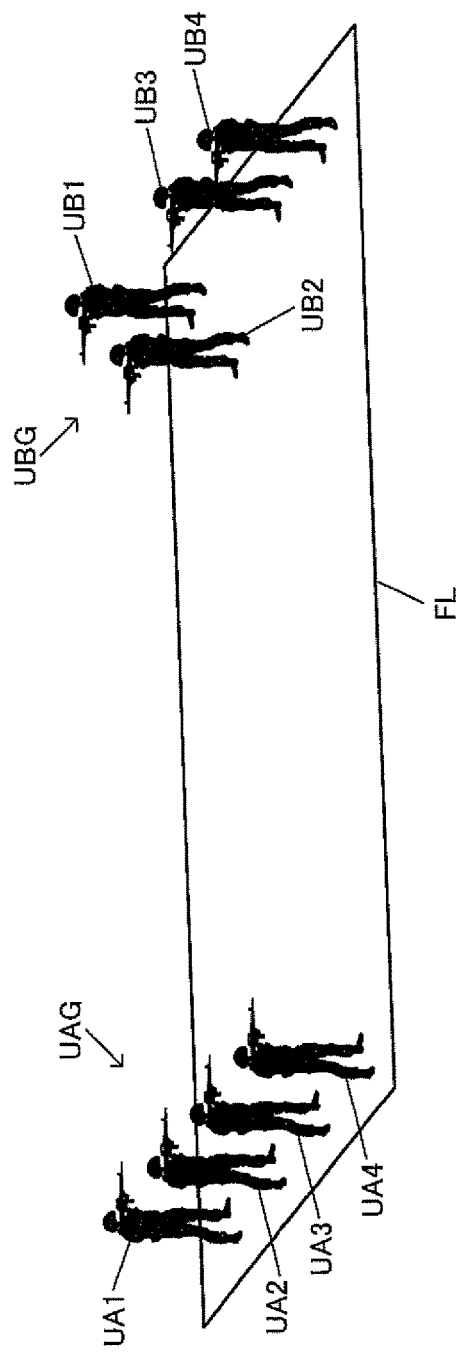
FIG. 6A and FIG. 6B are diagrams illustrating a problem with collisions between users.
Figure 6B:
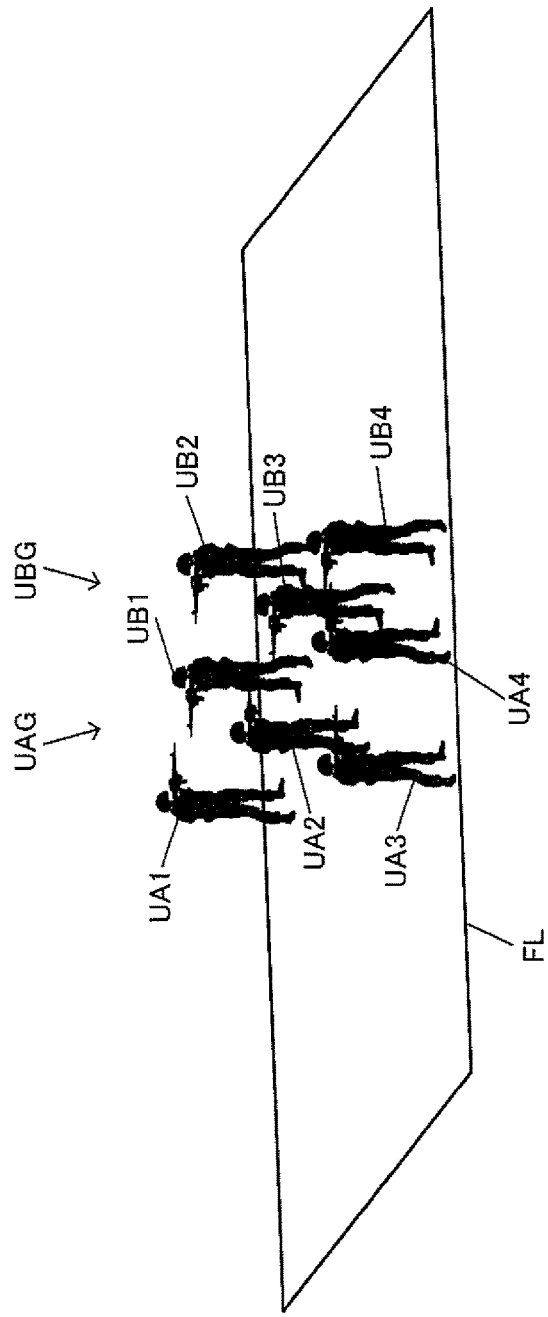

FIG. 6A and FIG. 6B are diagrams illustrating a problem with collisions between users. Referring to FIG. 6A, users UA1 to UA4 and UB1 to UB4 are located in the field FL of the real space. The users UA1 to UA4 constitute a user group UAG (first user group), and the users UB1 to UB4 constitute a user group UBG (second user group). In the present embodiment, the user group UAG and the user group UBG play a team battle. For example, the user group UAG is a first team, the user group UBG is a second team, and the first team and the second team play a team battle. The final game performances are determined team performances and individual performances of the users constituting the teams.

Referring to FIG. 6A, the user groups UAG and UBG are located and move in the same field FL. Accordingly, as illustrated in FIG. 6B, when the user groups UAG and UBG come closer to each other, there may occur collisions between users. That is, referring to FIG. 6B, the user group UAG and the user group UBG as each other's enemies battle with each other in disarray, and the fields of view of the users are covered with the HMDs. Therefore, there may occur a collision between the user UA1 in the user group UAG and the user UB1 in the user group UBG, for example.

Figure 7A:
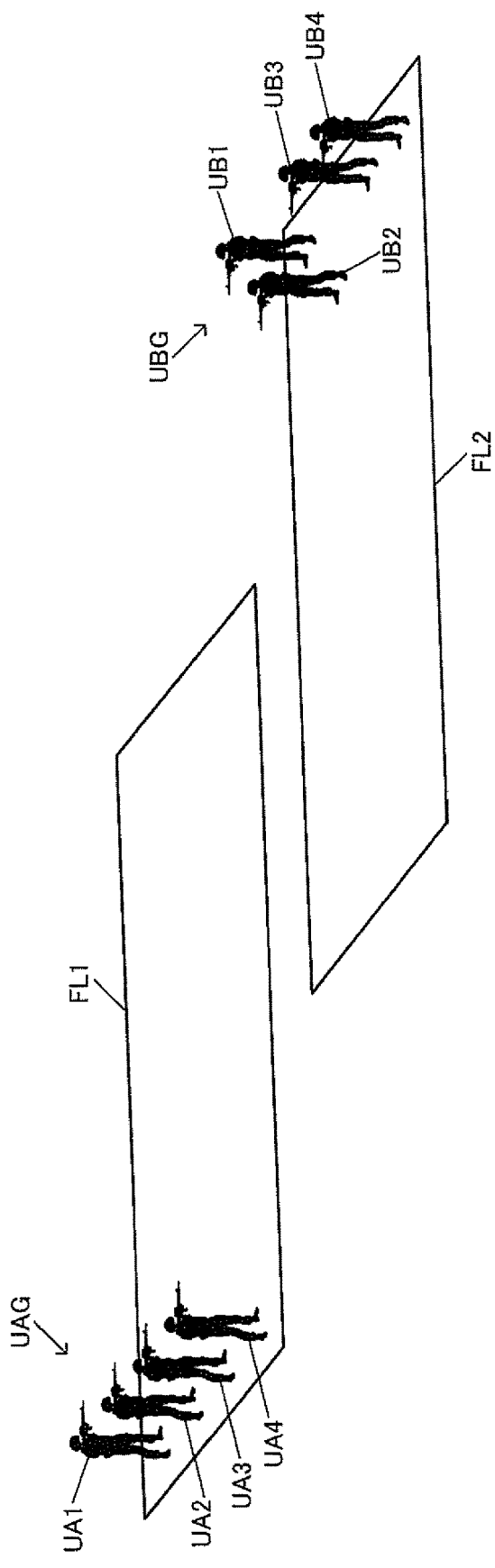
FIG. 7A and FIG. 7B are diagrams illustrating a method for preparing fields corresponding to user groups.

Thus, in the present embodiment, a field FL1 in which the user UA1 to UA4 in the user group UAG play the game and a field FL2 in which the users UB1 to UB4 in the user group UBG play the game are separately provided, for example, as illustrated in FIG. 7A. For example, the fields FL1 and FL2 are provided in a facility or the like so that the users UA1 to UA4 play the game while moving in the field FL1 and the users UB1 to UB4 play the game while moving in the field FL2. In this case, it is desired to provide a partition or the like between the field FL1 and the field FL2 so that the users in one of the fields cannot enter the other field.

The fields FL1 and FL2 may partially overlap each other. The fields FL1 and FL2 are not limited to flat fields but may be fields with undulations or fields in which various installations are placed. FIG. 7A illustrates the two fields FL1 and FL2 but the number of fields may be three or more. In addition, the number (fixed number) of users in each of the fields is not limited to four but may be three or less or five or more. For example, each of the fields FL1 and FL2 may be divided into four to prepare the total eight fields, and one user, for example, may be arranged in each of the eight fields. This makes it possible to avoid collisions between the users in the same team.

Figure 7B:
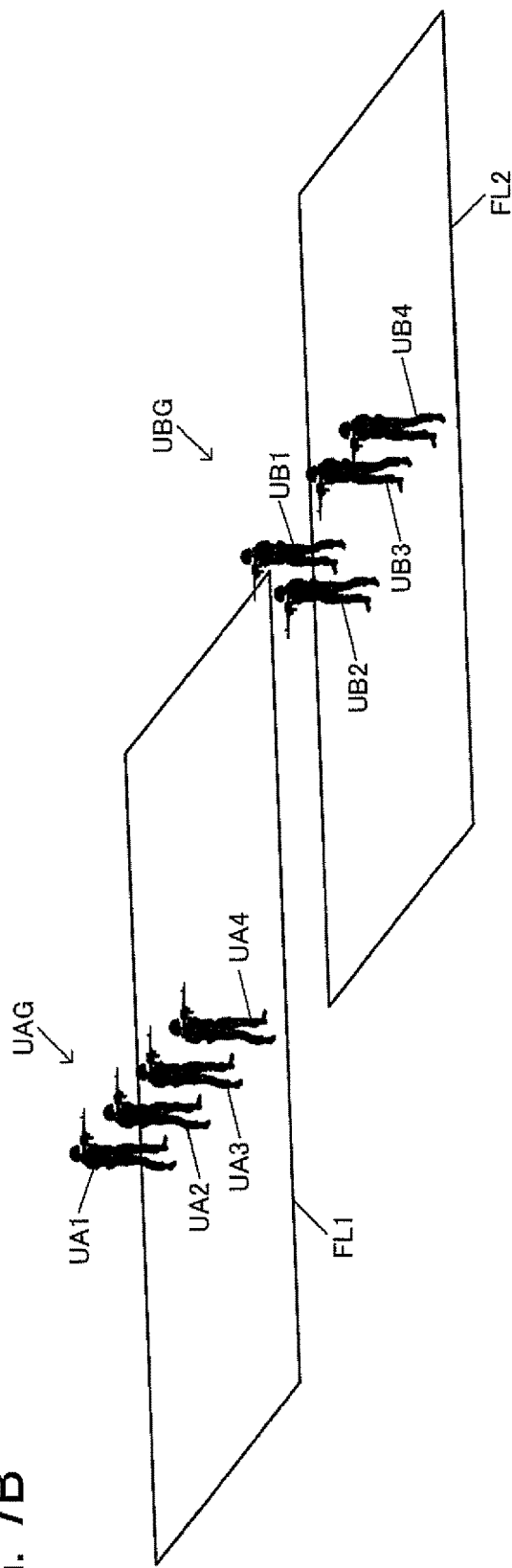

Providing the separate fields FL1 and FL2 as illustrated in FIG. 7A prevents a situation in which the users in the user groups UAG and UBG collide with each other as illustrated in FIG. 7B even when each of the user groups UAG and UBG move into the enemy's side (front side), for example. That is, referring to FIG. 6B, there occurs a situation in which the users in the both teams mix with each other and collide with each other, whereas referring to FIG. 7B, such a situation does not occur.

That is, as illustrated in FIG. 7B, the user group UAG is located in the field FL1, the user group UBG is located in the field FL2, and these fields FL1 and FL2 are different fields. This prevents a situation in which the users in the user groups UAG and UBG mix and collide with each other. According to the present embodiment, it is possible to suppress not only collisions between the users in the opposite teams but also collisions between the users in the same team.

Figure 8:
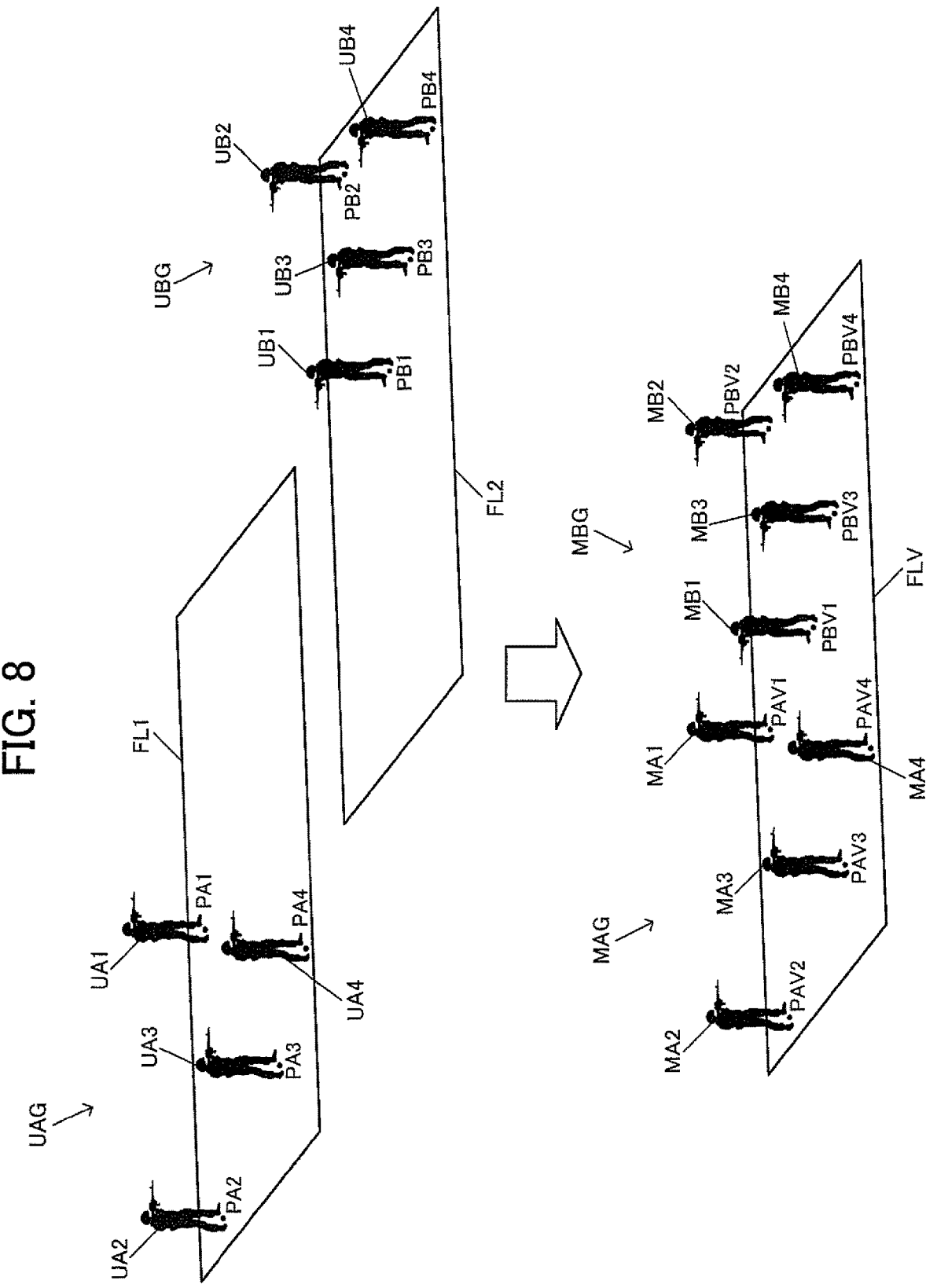
FIG. 8 is a diagram illustrating a method according to the present embodiment.

In the present embodiment, the user groups UAG and UBG are arranged in the fields FL1 and FL2 as illustrated in FIG. 7A and FIG. 7B, and moving body groups MAG and MBG in the virtual space are arranged as illustrated in FIG. 8. Specifically, the moving body group MAG corresponding to the user group UAG in the field FL1 and the moving body group MBG corresponding to the user group UBG in the field FL2 of the real space are arranged in the common virtual field FLV of the virtual space.

For example, the moving bodies MA1 to MA4 in the moving body group MAG corresponding to the users UA1 to UA4 in the user group UAG are arranged at positions PAV1 to PAV4 in the virtual field FLV corresponding to the positions PA1 to PA4 of the UA1 to UA4 in the field FL1. For example, the user UA1 is located at the position PA1 in the field FL1 of the real space, but the moving body MA1 corresponding to the user UA1 is arranged at the position PAV1 corresponding to the position PA1 in the virtual field FLV of the virtual space. The user UA2 is located at the position PA2 in the field FL1 of the real space, but the moving body MA2 corresponding to the user UA2 is arranged at the position PAV2 corresponding to the position PA2 in the virtual field FLV. The same thing applies to the users UA3 and UA4 and the moving bodies MA3 and MA4.

In addition, moving bodies MB1 to MB4 in the moving body group MBG corresponding to the users UB1 to UB4 in the user group UBG are arranged at positions PBV1 to PBV4 in the virtual field FLV corresponding to the positions PB1 to PB4 of UB1 to UB4 in the field FL2. For example, the user UB1 is located at the position PB1 in the field FL2 of the real space, but the moving body MB1 corresponding to the user UB1 is arranged at the position PBV1 corresponding to the position PB1 in the virtual field FLV of the virtual space. The user UB2 is located at the position PB2 in the field FL2 of the real space, but the moving body MB2 corresponding to the user UB2 is arranged at the position PBV2 corresponding to the position PB2 in the virtual field FLV of the virtual space. The same thing applies to the users UB3 and UB4 and the moving bodies MB3 and MB4.

In the present embodiment, in the game in which the moving bodies as avatars of the plurality of users wearing the HMDs covering their fields of view freely moves and play the game in the virtual field of the virtual space, the plurality of fields is provided in the real space in correspondence with the virtual field. Then, the plurality of users are divided into the plurality of fields, and the game process is executed. In the virtual space reflected on the users' HMDs, relative position information of the users in the real space is unified as if all the users play the game in one field. Virtually arranging the moving bodies as avatars of the users in the virtual field of the virtual space implements a virtual experience game with higher virtual reality.

Figure 9:
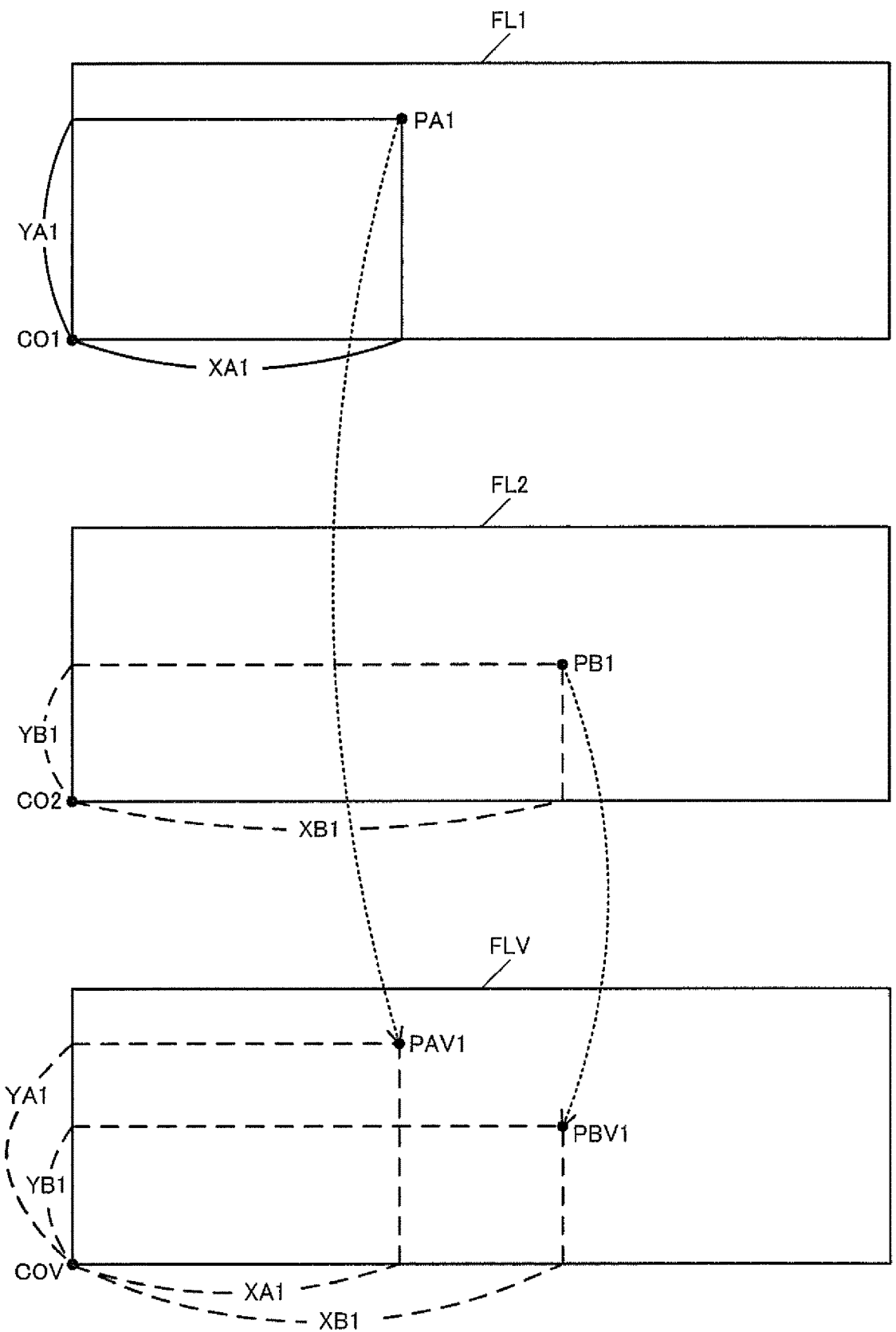
FIG. 9 is a diagram illustrating a method for a coordinate transformation from a position in a field to a position in a virtual field.

FIG. 9 is a diagram illustrating an example of a coordinate transformation process from the positions PA1 to PA4 in the field FL1 to the positions PAV1 to PAV4 in the virtual field FLV and an example of a coordinate transformation process from the positions PB1 to PB4 in the field FL2 to the virtual positions PBV1 to PBV4 in the virtual field FLV illustrated in FIG. 8.

For example, referring to FIG. 9, the origin points in the fields FL1 and FL2 (broadly, reference point) are respectively set as CO1 and CO2, and the origin point in the virtual field FLV (reference point) is set as COV. The position PA1 in the field FL1 is located at a position of XA1 in an X coordinate and YA1 in a Y coordinate from the origin point CO1 as illustrated in FIG. 9. The position PB1 in the field FL2 is located at a position of XB1 in the X coordinate and YB1 in the Y coordinate from the origin point CO2.

In this case, in the virtual field FLV, the position PAV1 corresponding to the position PA1 in the field FL1 is set at a position of XA1 in the X coordinate and YA1 in the Y coordinate from the origin point COV. That is, the position PAV1 is set at a position shifted from the origin point COV by the relative coordinates XA1 and YA1. The positions PAV2 to PAV4 corresponding to the positions PA2 to PA4 can be set in the same manner.

In the virtual field FLV, the position PBV1 corresponding to the position PB1 in the field FL2 is set at a position of XB1 in the X coordinate and YB1 in the Y coordinate from the origin point COV. That is, the position PBV1 is set at a position shifted from the origin point COV by the relative coordinates XB1 and YB1. The positions PBV2 to PBV4 corresponding to the positions PB2 to PB4 can be set in the same manner.

Accordingly, the moving bodies MA1 and MB1 corresponding to the users UA1 and UB1 can be arranged in the virtual field FLV of the virtual space while maintaining the relative positional relationship between the user UA1 and the user UB1 assumed in the real space. For example, in a situation where the users UA1 and UB1 are assumed to come into proximity to each other in the real space, the moving bodies MA1 and MB1 corresponding to the users UA1 and UB1 also come into proximity to each other in the virtual space. In this case, the situation where the users UA1 and UB1 are assumed to come into proximity to each other refers to a situation where these users are assumed to come into proximity to each other as a game setting. That is, as illustrated in FIG. 7A and FIG. 7B, the user UA1 is positioned in the field FL1, and the user UB1 is positioned in the field FL2. This prevents an event that the users UA1 and UB1 collide with each other even though the users UA1 and UB1 actually do not approach each other.

The method for coordinate transformation from the position in the field in the real space to the position in the virtual field is not limited to the method described in FIG. 9 but various modifications are possible. For example, FIG. 9 describes that the real space (real world) and the virtual space (virtual world) are identical in scale, but the scale of the real space and the scale of the virtual space may be different. For example, 1 m in the virtual space may be set to be longer or shorter than 1 m in the real space. In this case, the X coordinates and Y coordinates of the positions PAV1 and PB1 in the virtual field FLV illustrated in FIG. 9 may be greater or smaller than the X coordinates and the Y coordinates of the positions PA1 and PB1 in the fields FL1 and FL2 of the real space. For example, the X coordinates and the Y coordinates of the positions PAV1 and PBV1 in the virtual field FLV are determined by multiplying the X coordinates and the Y coordinates of the positions PA1 and PB1 in the fields FL1 and FL2 of the real space by a scale coefficient KS (KS<1 or KS>1).

In addition, referring to FIG. 9, the reference points (origin points CO1 and CO2) in the position coordinates of the fields FL1 and FL2 are set at the same position (at the lower left corner). However, the present embodiment is not limited to this but the positions of the reference points in the fields FL1 and FL2 may be different from each other. For example, the reference point (origin point) of the field FL1 may be set to the position of a first corner among lower left, lower right, upper left, and upper right corners, and the reference point (origin point) of the field FL2 may be set to the position of a second corner different from the first corner among the lower left, lower right, upper left, and upper right corners.

In addition, referring to FIG. 9, the directions (orientations) and shapes of the fields FL1 and FL2 are identical, but the directions and shapes of the fields FL1 and FL2 may be different from each other. For example, referring to FIG. 9, both the fields FL1 and FL2 are fields in which the long side is set in a first direction (for example, horizontal direction). However, the directions of the fields may be different from each other such that the long side in the field FL1 is set in the first direction and the long side in the field FL2 is set in a second direction different from the first direction, for example. In addition, the shapes of the fields may be different from each other such that the field FL1 has a first shape and the field FL2 has a second shape different from the first shape.

Figure 10:
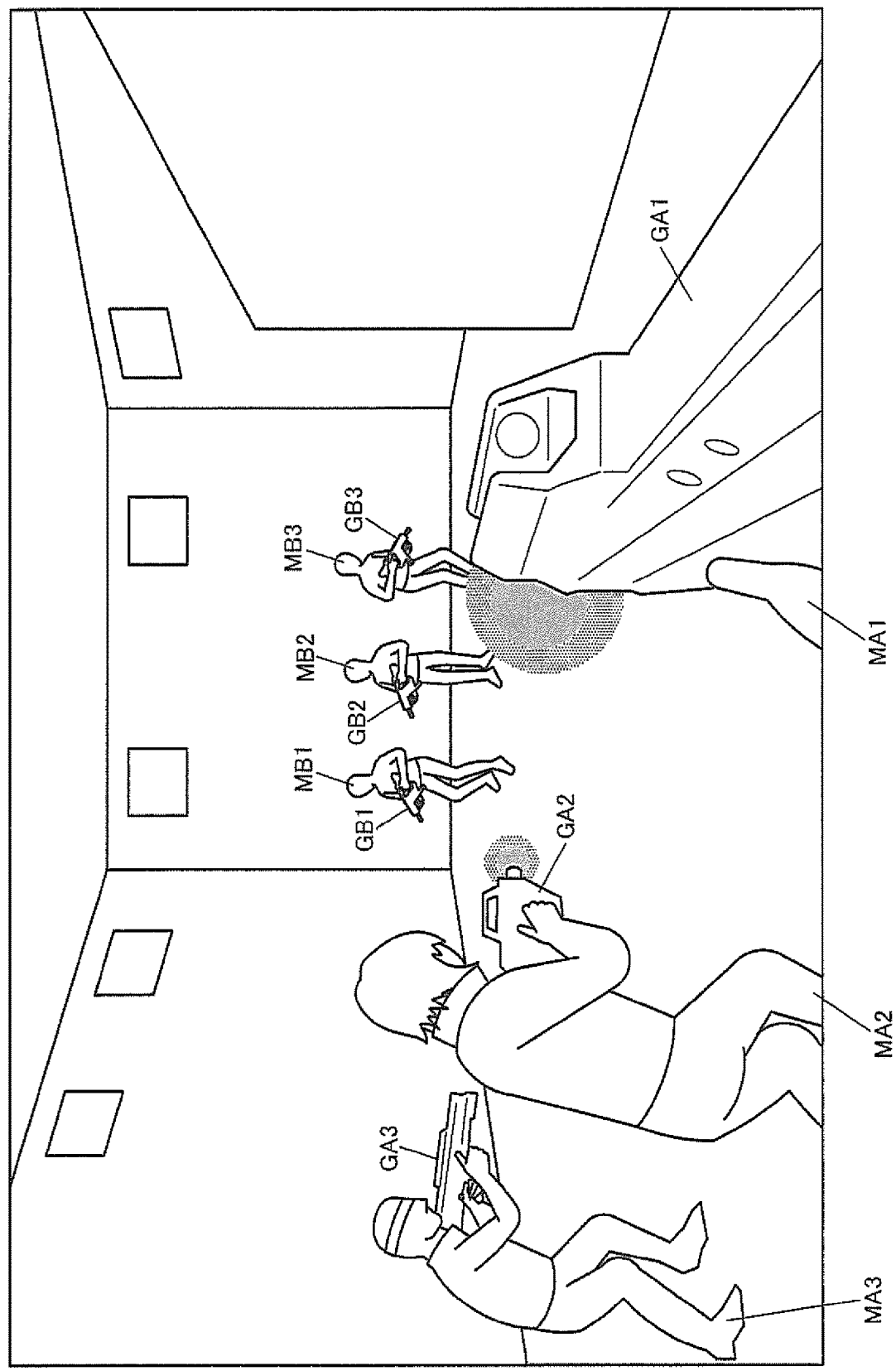
FIG. 10 is a diagram illustrating an example of a game image generated in the present embodiment.

FIG. 10 is a diagram illustrating an example of a game image generated in the present embodiment. The game image is displayed on the HMDs worn by the users. For example, FIG. 10 illustrates an example of a game image displayed on the HMD of the user UA1 in which a hand of the moving body MA1 corresponding to the user UA1 and a gun GA1 (gun display object) held by the moving body MA1 are seen. In addition, the moving bodies MA2 and MA3 corresponding to the users UA2 and UA3 in the same team and the moving bodies MB1, MB2, and MB3 corresponding to the users UB1, UB2, and UB3 in the opposite team are also displayed. The moving bodies MA1, MA2, and MA3 in the same team are attacking by held guns GA1, GA2, and GA3 against the enemies, and the moving bodies MB1, MB2, and MB3 in the opposite team are attacking by held guns GB1, GB2, and GB3. In this manner, in the present embodiment, the image of the opposite team is subjected to display process by arranging the moving bodies MB1, MB2, and MB3 as avatars of the enemies at the actual positions of the enemies. As described later, the sounds to be output to the users are also subjected to sound source calculation according to the arrangement settings in the virtual field FLV.

In this manner, in the present embodiment, a battle game process is performed between the user group UAG (the moving body group MAG) belonging to the same team (broadly, the first group or the first team) and the user group UBG (the moving body group MBG) belonging to the opposite team (broadly, the second group or the second team). Then, the game image resulting from the battle game process is displayed on the HMDs of the users. In this manner, it is possible to implement a team battle game in which the users can virtually experience a battle between the teams. That is, according to the system using HMDs, a vast VR space spreads all around the fields of view of users so that the users can experience a battle in the vast VR space. Accordingly, it is possible to provide the users with virtual reality as if they are actually fighting a battle.

In such a team battle game, as illustrated in FIG. 6B, when allies and enemies come into proximity to each other and mix with each other, there may occur a situation where users collide with each other in the real space, which is not preferred in the operation of the simulation system.

In this respect, according to the method in the present embodiment, as illustrated in FIG. 7A and FIG. 7B, the user groups UAG and UBG are arranged in the different fields FL1 and FL2, thereby making it possible to prevent a situation where the enemies and the allies come into proximity to each other and collide with each other. In the virtual space, as illustrated in FIG. 8, the moving body groups MAG and MBG corresponding to the user groups UAG and UBG are arranged in the same virtual field FLV. This allows the users to virtually experience a realistic battle as in the real world as illustrated in FIG. 10. Therefore, it is possible to implement a simulation system that provides virtual experience with higher virtual reality while suppressing the occurrence of collisions between users.

In the present embodiment, a generation process of sounds to be output to the users is performed based on the position information of the moving bodies in the virtual field of the virtual space. For example, a formation process of a sound field is performed based on the position information of the moving bodies in the virtual field, and the sounds to be output to the users are generated based on the formed sound field. That is, the sounds to be generated from the actual positions of the users are calculated and output in such a manner as to be generated from the virtually arranged positions in the virtual field by integration of the relative position information.

Figure 11A:
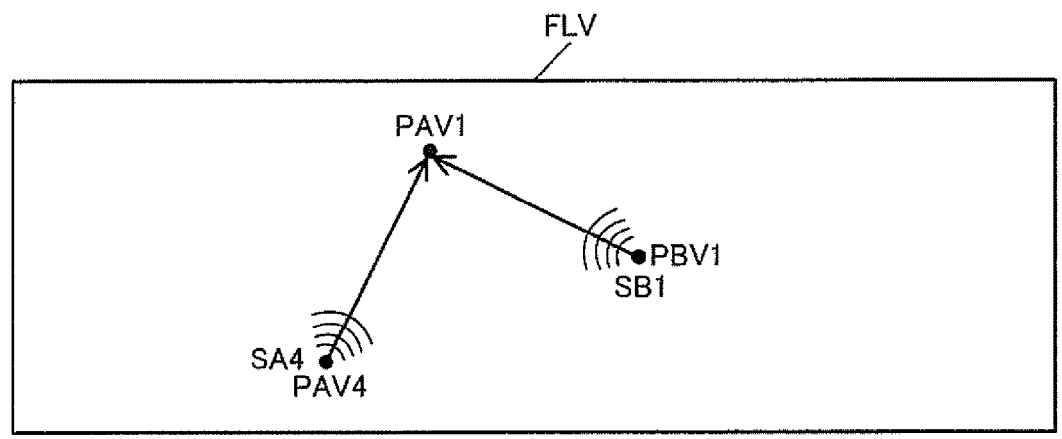
FIG. 11A and FIG. 11B are diagrams illustrating a method for sound processing according to the present embodiment.

For example, referring to FIG. 11A, the moving bodies MA1, MA4, and MB1 as illustrated in FIG. 8 are arranged at the positions PAV1, PAV4, and PBV1 in the virtual field FLV. In this case, for the moving body MA1, the moving body MA4 is an ally and the moving body MB1 is an enemy.

The sounds to be emitted from the position PAV4 of the moving body MA4 are transferred to the position PAV1 of the moving body MA1 as sounds from a sound source SA4 (virtual sound source) set at the position PAV4. Then, the transferred sounds are output to the user UA1 of the moving body MA1. For example, when the user UA4 of the moving body MA4 talks to the user UA1 as an ally, the voice of the user UA4 is transferred to the position PAV1 of the moving body MA1 as the sound from the sound source SA4. Accordingly, the user UA1 hears the voice of the user UA4 from the position PAV4, thereby implementing the formation of a sound field with higher virtual reality.

The sounds emitted from the position PBV1 of the moving body MB1 are transferred to the position PAV1 of the moving body MA1 as sounds from a sound source SB1 (virtual sound source) set at the position PBV1. Then, the transferred sounds are output to the user UA1 of the moving body MA1. For example, when the moving body MB1 of the user UB1 fires a gun to the moving body MA1 of the user UA1 as an enemy, the sound of the gunshot is transferred to the position PAV1 of the moving body MA1 as a sound from the sound source SB1. Accordingly, the user UA1 hears the sound of the gunshot made by the moving body MB1 of the user UB1 from the position PBV1, thereby implementing the formation of a sound field with higher virtual reality.

In this manner, in the present embodiment, the sound field is formed in the virtual space based on the position information of the moving bodies in the virtual field FLV, and the sounds to be output to the users are generated. That is, as illustrated in FIG. 7A and FIG. 7B, although the user groups UAG and UBG are actually located in the different fields FL1 and FL2, in the sound generation process, the sound field is formed using the position information of the moving bodies in the virtual field FLV, and the sounds to be heard by the users are generated. Therefore, it is possible to implement a simulation system of virtual experience with higher virtual reality while suppressing the occurrence of collisions between users.

Figure 11B:
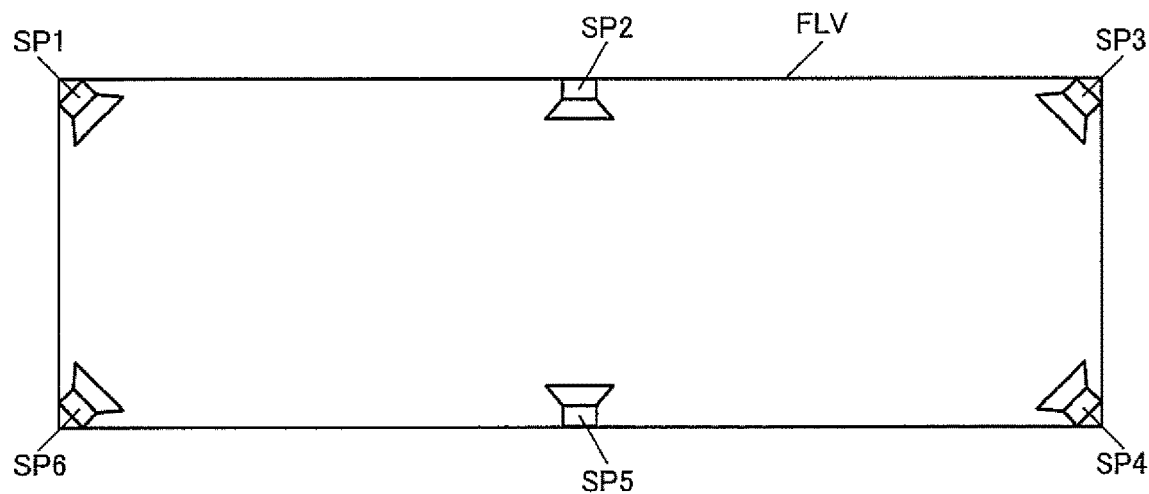

The formation of the sound field in the virtual space can be implemented by using virtual speakers SP1 to SP6 virtually arranged at respective positions in the virtual field as illustrated in FIG. 11B, for example. For example, with the formation of the sound field using the virtual speakers SP1 to SP6, the virtual sound sources SA4 and SB1 are set at the positions PAV4 and PBV1 as illustrated in FIG. 11A so that the sound sources SA4 and SB1 virtually output corresponding sounds. Accordingly, it is possible to implement the formation of a virtual sound field as if the user UA1 at the position PAV1 can hear voices and gunshots from the positions PAV4 and PBV1 of the sound sources SA4 and SB1.

3.2 Notification Process for Warning

Figure 5B:
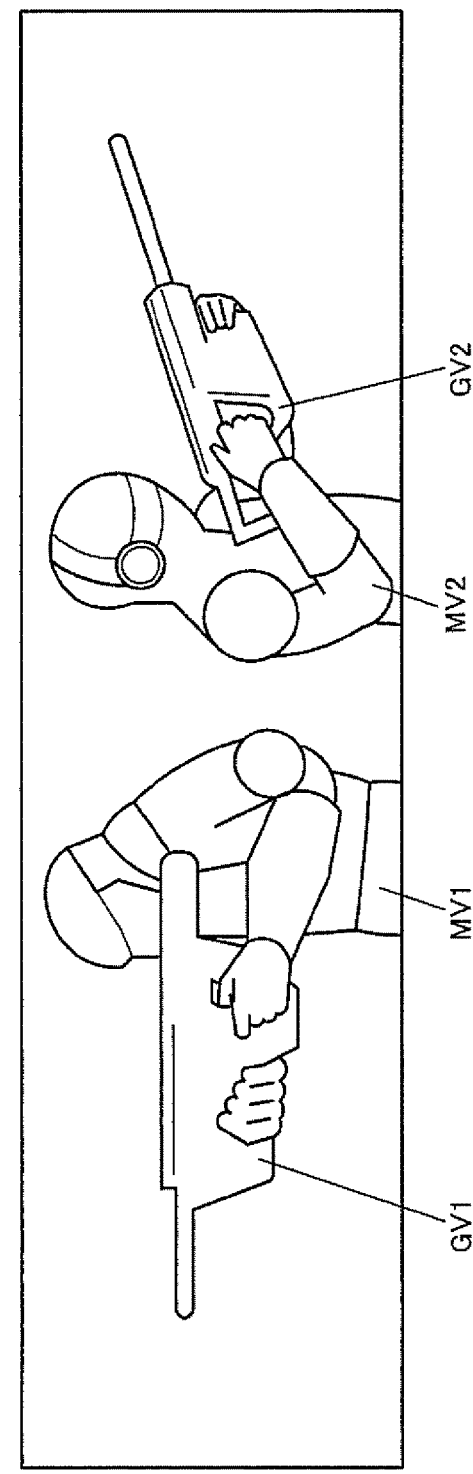
Figure 12:
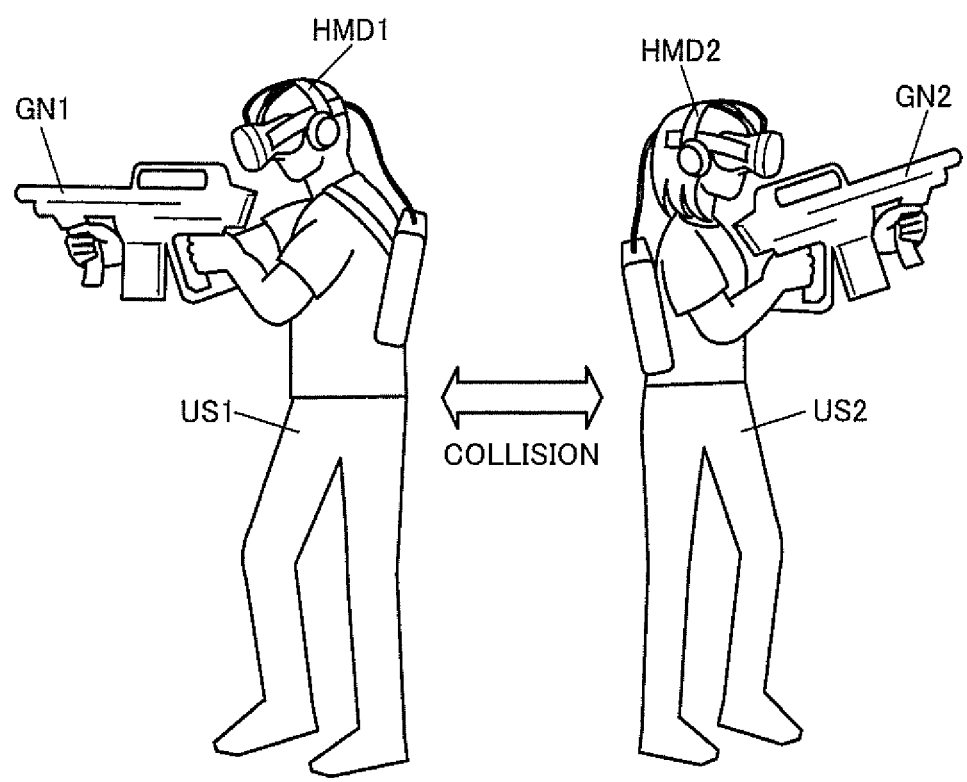
FIG. 12 is a diagram illustrating a problem with a collision between users.

According to the method in the present embodiment illustrated in FIG. 7A to FIG. 8, it is possible to prevent a collision between an enemy and an ally such as the user groups UAG and UBG. However, there may occur a collision between allies. For example, referring to FIG. 12, the users US1 and US2 are allies in the same team and are positioned in the same field. Thus, the users US1 and US2 may collide with each other in the real space. For example, when the users US1 and US2 are positioned back to back as illustrated in FIG. 12, the HMD1 of the user US1 does not display the moving body MV2 corresponding to the user US2 (FIG. 5B). In addition, the HMD2 of the user US2 does not display the moving body MV1 corresponding to the user US1 (FIG. 5B). Accordingly, if the users US1 and US2 move backward, for example, the users US1 and US2 may collide with each other.

Thus, in the present embodiment, the notification process for warning of a collision between the users in the real space is performed. For example, the prediction process of a collision between the users in the real space is performed, and based on the result of the prediction process, the notification process for warning of a collision between the users is performed. Specifically, when users are about to collide with each other in the real space, the notification process for warning of a collision is performed to notify of that by displaying an image on the HMDs (warning display), issuing a sound from the sound output section, vibrating the vibration devices provided in the users' equipment or HMDs, firing an air gun, or the like. This makes it possible to properly notify users that there is the risk of a collision between the users. The notification process for warning a collision may be performed to a user at a high movement speed or a high movement acceleration in the real space.

Figure 13A:
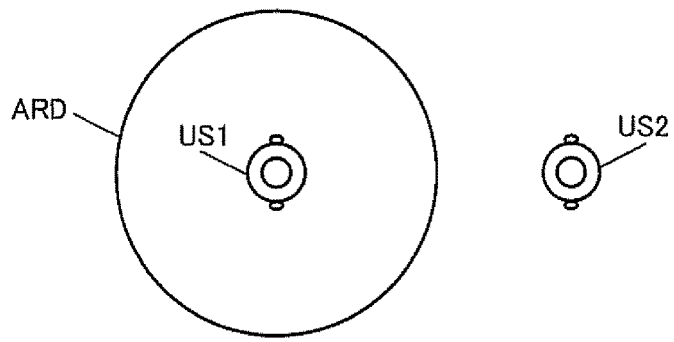
FIG. 13A to FIG. 13D are diagrams illustrating a notification method for warning of a collision.
Figure 13B:
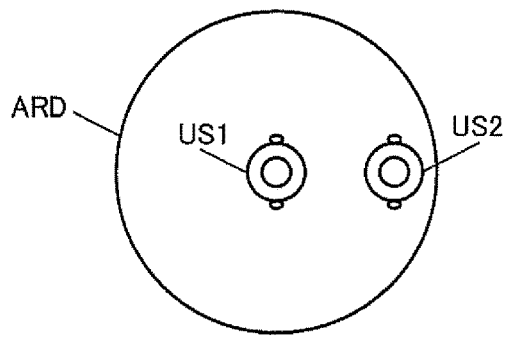
Figure 13C:
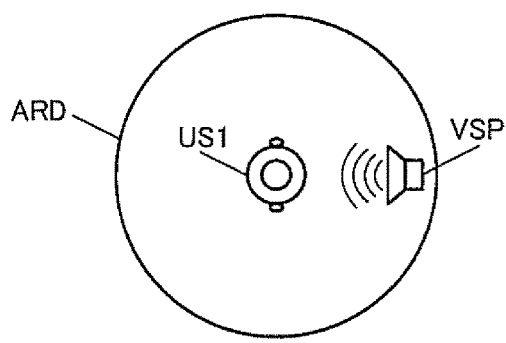

For example, referring to FIG. 13A, a collision detection range ARD is set for the user US1. For example, referring to FIG. 13A, the detection range ARD as a distance range is set with respect to the position of the user US1. Referring to FIG. 13A, the user US2 is not within the detection range ARD. However, referring to FIG. 13B, the user US2 is within the detection range ARD. In this case, it is predicted that the users US1 and US2 are in a proximity relationship to each other and there is the risk of a collision between the users in the real space. That is, the prediction process of a collision between the users in the real space is performed using the detection range ARD. Then, the notification process for warning of a collision is performed based on the result of the prediction process using the detection range ARD. That is, when the user US2 is within the detection range ARD and the occurrence of a collision is predicted, the notification process for warning of the collision is performed. For example, as illustrated in FIG. 13C, the user US1 is notified of the risk of a collision of the user US2 with the user US1 by using a sound from a virtual speaker VSP (virtual sound source) provided at the position of the user US2. In this case, for example, as the movement speed of the user US2 is higher, the warning sound from the virtual speaker VSP may be made louder or the detection range ARD for determination on proximity relationship may be made wider.

Figure 13D:
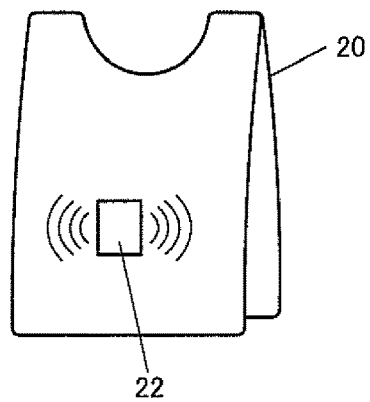

In addition, as illustrated in FIG. 13D, a vibration device 22 may be provided in an outfit such as a jacket 20 worn by the user so that the notification process for warning of a collision is performed by vibrating the vibration device 22. Specifically, as illustrated in FIG. 13B, when it is determined that the users US1 and US2 are in a proximity relationship and it is predicted that the users US1 and US2 will collide with each other, the vibration device 22 is vibrated to notify the users of the risk of a collision. Alternatively, a vibration device may be provided in the HMD so that the notification process for warning of a collision is performed by vibrating the vibration device.

Figure 14:
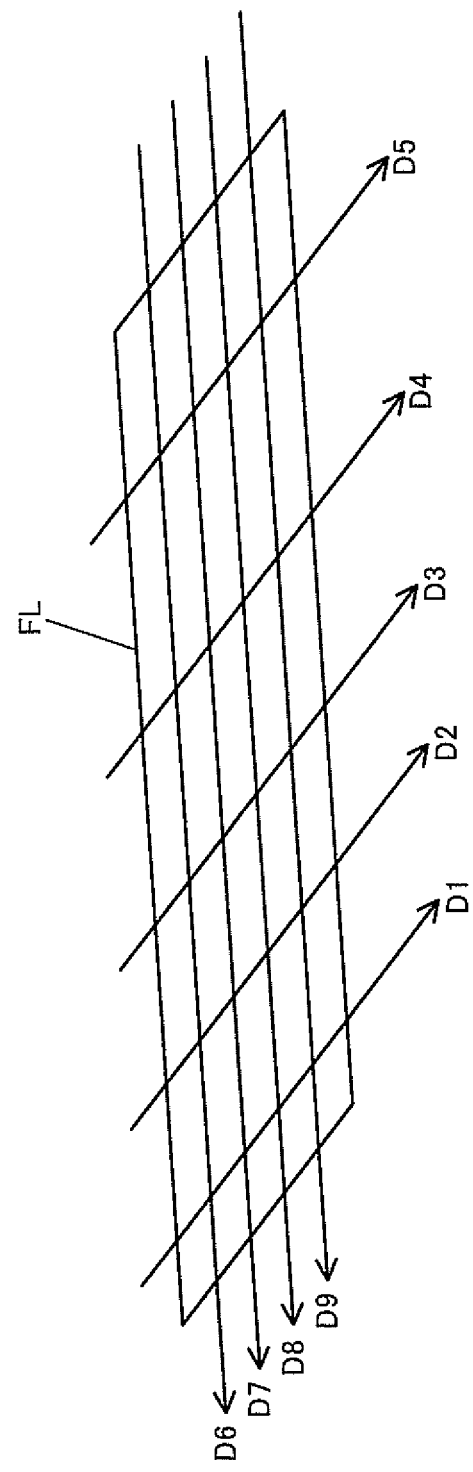
FIG. 14 is a diagram illustrating a notification method for warning of a collision.

Alternatively, a notification device such as an air gun may be provided in the field FL so that the notification process for warning of a collision is performed by firing the air gun in directions (paths) as illustrated with D1 to D9 in FIG. 14. Alternatively, a plurality of speakers may be provided in the field FL so that the notification process for warning of a collision is performed by outputting sounds from the speakers in the directions (paths) as illustrated with D1 to D9 in FIG. 14. Alternatively, a plurality of vibration devices may be installed in a matrix, for example, on the floor of the field FL so that the notification process for warning of a collision is performed by vibrating the vibration devices. Alternatively, a warning display image may be displayed on the HMD. In this manner, various modifications are possible for a method for making a notification for warning.

In the present embodiment, the detection process of motions of the users' equipment or the motions of the users in the real space is performed, and based on the result of the detection process, the notification process for warning about the motion of the equipment or the motion of the users is performed. Specifically, the notification process for warning is performed on the condition that it is determined based on the position information of a user and another user that a user and another user are in a proximity relationship. For example, when the movement speed of the equipment such as a gun-type controller (gun) is high, the notification for warning is made to the user by vibration of the vibration device, making a sound, firing an air gun, or the like. When the warning is issued a given number of times, for example, the gameplay of the user may be terminated.

Figure 15A:
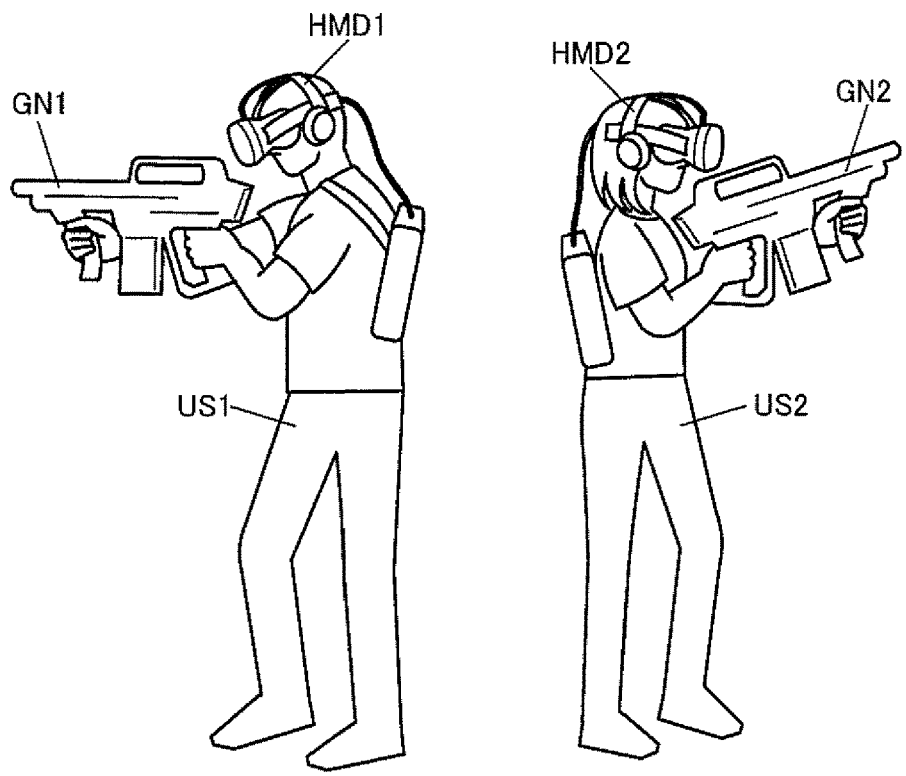
FIG. 15A and FIG. 15B are diagrams illustrating a problem with equipment of a user colliding with another user.
Figure 15B:
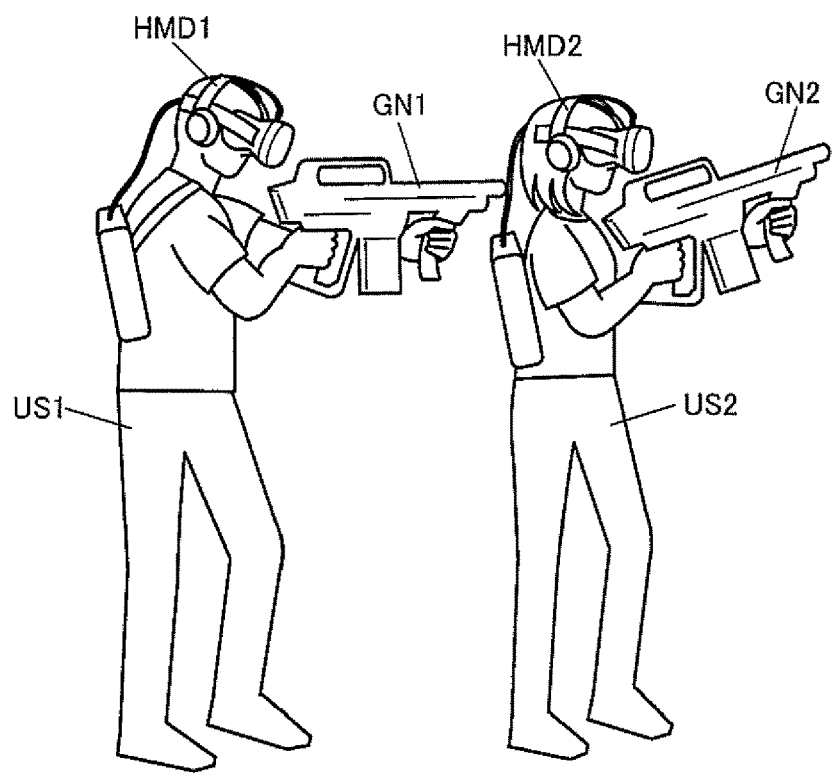

For example, referring to FIG. 15A, the users US1 and US2 are positioned back to back. In this state, when the user US1 turns to the user US2 as illustrated in FIG. 15B, the gun-type controller GN1 (broadly, equipment) held by the user US1 may hit the user US2. Otherwise, while the user US1 is vigorously moving the gun-type controller GN1, for example, when the user US2 approaches the user US1, the vigorously moving gun-type controller GN1 may hit the user US2. Otherwise, while the user US1 does not have any equipment such as the gun-type controller GN1 but is vigorously moving body parts such as hands or legs, when the user US2 approaches the user US1, there may cause an event that the vigorously moving hands or legs hit the user US2. For example, there may cause an event that a punch or a kick given by the user US1 hits the user US2.

To prevent these events, the detection process of the motions of the users' equipment or the motions of the users is performed in the real space. Specifically, the detection process of whether the motion speed of the equipment or the user becomes equal to or greater than a given threshold or whether the motion amount of the equipment or the user becomes equal to or greater than a given threshold is performed. Then, when the motion speed of the equipment or the user becomes equal to or greater than the given threshold or the motion amount of the equipment or the user becomes equal to or greater than the given threshold, the notification process for warning is performed to the user. This prevents the occurrence of an event that the equipment or the like hits another user as illustrated in FIG. 15A and FIG. 15B. Otherwise, this prevents the occurrence of an event that a punch or a kick given by a user hits another user. The method of notification for warning can be the same as any of the methods of notification for warning of a collision illustrated in FIG. 13A to FIG. 14. That is, the various methods of notification for warning using sound, vibration, air gun, or warning image can be used.

Figure 16:
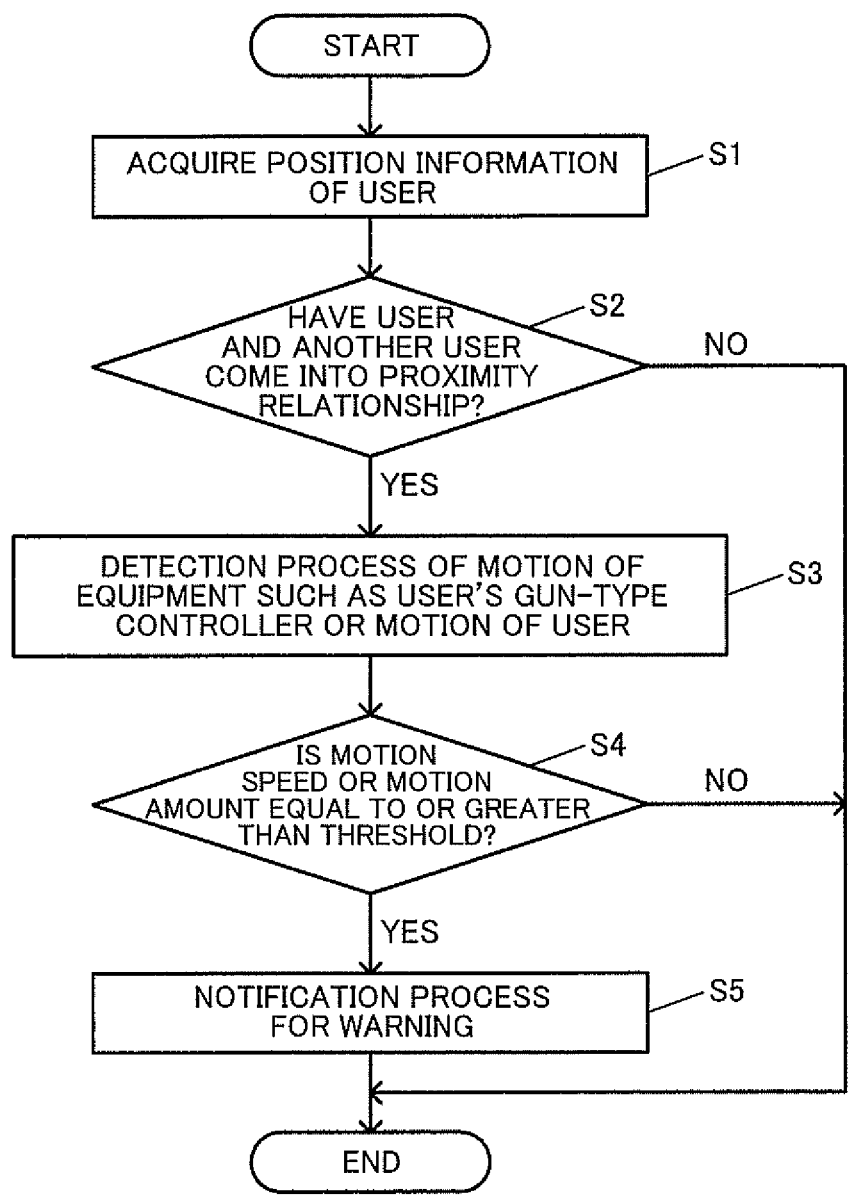
FIG. 16 is a flowchart of a notification process for warning based on a detection result of motion of equipment or a user.

FIG. 16 is a flowchart of an example of notification process for warning based on the detection result of motions of the equipment or the user. First, the position information of the user is acquired (step S1). For example, the HMD tracking process as described above with reference to FIG. 2A to FIG. 3B is performed, and based on the result of the tracking process, the position information of the user is acquired.

Next, it is determined whether a user and another user have come into a proximity relationship (step S2). For example, as illustrated in FIG. 13A and FIG. 13B, it can be determined whether the user US1 and the user US2 have come into the proximity relationship by determining whether the user US2 has entered the detection range ARD set for the user US1.

Then, when it is determined that the user and the other user have come into the proximity relationship, the detection process of the motions of the equipment such as the users' gun-type controller or the motion of the users is performed (step S3). For example, the detection process of the motions of the equipment such as gun-type controllers can be implemented by using motion sensors provided as equipment (for example, gyro sensors or acceleration sensors). The detection process of the motions of the users may be implemented by installing and using motion sensors at the hands or legs of the users or capturing images of the motions of the users by an external imaging device.

In this manner, in the present embodiment, the notification process is performed on the condition that it is determined that the users are in the proximity relationship based on the position information of the users. This makes it possible to prevent an event that, even though the users are not in the proximity relationship, the detection process of the motion of the equipment or the motion of the user is unnecessarily performed or an unnecessary warning is issued.

Next, it is determined whether the motion speed or the motion amount of the equipment or the users has become equal to or greater than the threshold (step S4). Then, when the motion speed or the motion amount has become equal to or greater than the threshold, the notification process for warning is performed (step S5). For example, the notification process for warning about the motions of the equipment or the user is performed using sound, vibration, image, air gun, or the like. This effectively prevents the occurrence of an event that the equipment of a user or the hands or legs of a user hit another user.

3.3 Setting of the Movement Amount and Movement Speed of the Moving Body

In the present embodiment, the moving body may be moved in the virtual space by a movement amount different from the movement amount of the user in the real space. For example, when the user moves by a distance of 1 m in the real space, the moving body corresponding to the user is moved in the virtual space by a distance longer than 1 m (for example, 1.5 to 3 m) to make the motion of the user compact, thereby reducing the possibility of a collision. In reverse, when the user moves 5 m in the real space, the moving body corresponding to the user may be moved by a distance shorter than 5 m (for example, 2 to 4 m) in the virtual space. In addition, the same effect may be implemented by changing the scale of the moving body (avatar). For example, the size of the moving body may be scaled down or scaled up to change the user's consciousness of movement, thereby avoiding a collision.

For example, referring to FIG. 17, the user US2 in the real space moves by a movement amount AM in the field FL. For example, the user US2 moves by the movement amount AM per unit time (frame). According to the movement of the user US2 in the real space, the moving body MV2 (avatar) as an avatar of the user US2 moves by a movement amount AMV in the virtual space. For example, the moving body MV2 moves by the movement amount AMV per unit time (frame). For example, referring to FIG. 17, the movement amount AMV of the moving body MV2 in the virtual space is larger than the movement amount AM of the user US2 in the real space. This causes the user to hesitate movement by a large amount, thereby making it possible to avoid a collision between users.

For example, referring to FIG. 17, another user exists in front of the user US2 in the real space. In this case, when the user US2 in the real space moves forward by the movement amount AM, the movement amount of the moving body MV2 as his or her own avatar seen on the HMD2 of the user US2 is AMV, which is larger than the movement amount AM in the real space. Seeing the movement of the moving body MV2 by the large movement amount AMV, the user US2 will hesitate his or her own movement in the real space and shorten his or her stride. This suppresses the occurrence of a collision with another user in front. In addition, the other user in front sees the moving body MV2 displayed on his or her own HMD moving by the large movement amount AMV. Specifically, the other user sees the moving body MV2 moving by the movement amount AMV larger than the movement amount AM of the user US2 in the real space. Accordingly, the other user acts such as moving backward, for example, to avoid the moving body MV2 from colliding with his or her moving body, thereby suppressing the occurrence of a collision between the user US2 and the other user. This effectively prevents a collision between allies, for example.

The same advantageous effect as illustrated in FIG. 17 may be obtained by changing the scale of the moving bodies (characters) in the virtual space. For example, making the scale of the moving bodies smaller than the scale of the users in the real space allows the users to feel the virtual space wider. In reverse, making the scale of the moving bodies larger than the scale of the users in the real space allows the users to feel the virtual space narrower. Changing the feeling of the scale of the virtual space felt by the users in this manner implements a method for causing a difference between the movement amount of the user and the movement amount of the moving body as illustrated in FIG. 17. Alternatively, the scale of the virtual space itself may be changed. For example, the scale of the field in the real space and the scale of the virtual field in the virtual space are made different from each other. Specifically, the scale of 1 m in the real space and the scale of 1 m in the virtual space are made different from each other. For example, making the scale of the virtual field where the moving body moves larger than the scale of the field where the user moves allows the user to feel the scale of the virtual space larger. When the user moves in the real space, the moving body is moved by a movement amount larger than the movement amount in the real space, for example. This suppresses the occurrence of a collision between users while allowing the users to feel the wide scale of the virtual space.

In addition, in the present embodiment, when it is determined that a user and another user in the real space have come into the proximity relationship, the movement process of accelerating the movement speed of another moving body corresponding to another user, accelerating the movement acceleration of the other moving body, or lengthening the movement distance of the other moving body may be performed. For example, in the real space, when another user (enemy or ally) satisfying an arrangement condition such as proximity to a user within 5 m is detected, the process of multiplying the movement speed, movement acceleration, or movement distance of the moving body as an avatar of the other user in the virtual space by a coefficient KM (KM>1) is performed to show the degree of the proximity in an enlarged state. Accordingly, the moving body corresponding to the other user is early displayed in the field of view of the HMD of the user to increase the degree of caution. After that, the coefficient KM may be slowly returned to KM=1 to restore the balance. This method is also useful at the time of a collision between a user in the real space and a moving body in the virtual space (a virtual collision described later).

Figure 18:
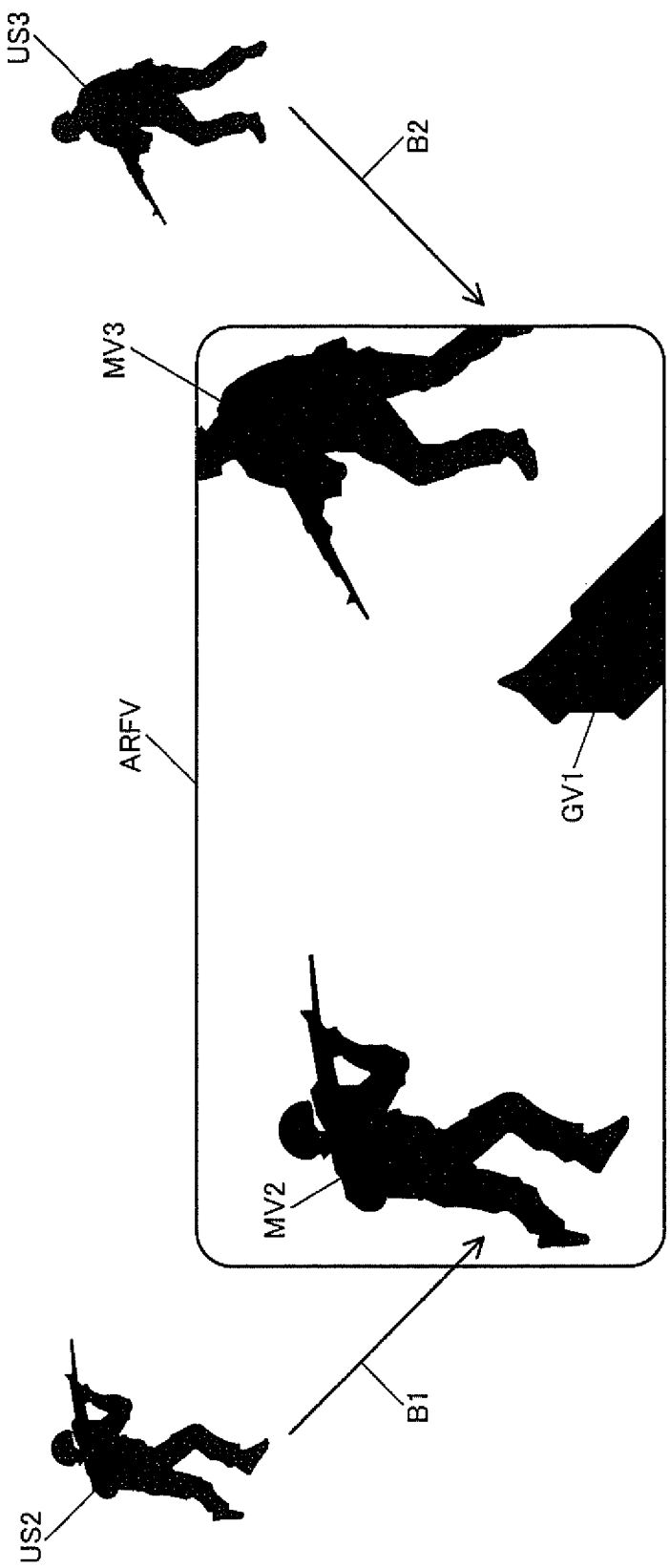
FIG. 18 is a diagram illustrating a method for accelerating a movement speed of another moving body corresponding to another user.

For example, referring to FIG. 18, ARFV represents the field of view range of the HMD, and GV1 represents a gun held by the moving body corresponding to the user. The field of view range ARFV of the HMD becomes wide to cover the whole periphery of the field of view of the user by providing an eyepiece on the HMD. However, FIG. 18 schematically illustrates the field of view range ARFV as a narrow range for the sake of simple description.

Referring to FIG. 18, when the other user US2 moves toward the user, the moving body MV2 in the virtual space corresponding to the user US2 moves at a higher movement speed than that of the user US2 in the real space (or a higher movement acceleration or a longer movement distance, which applies to the following description) and enters the field of view range ARFV of the user as illustrated by B1. That is, the moving body MV2 moves ahead of the user US2 in the real space, and the user US2 follows this movement. This suppresses an event that the user collides with the other user US2 in the real space. At this time, the notification process for warning as illustrated in FIG. 13A to FIG. 14 may be performed as well.

Similarly, when the other user US3 moves toward the user, the moving body MV3 in the virtual space corresponding to the user US3 moves at a movement speed higher than the movement speed of the user US3 in the real space, and enters the field of view range ARFV of the user as illustrated by B2. That is, the moving body MV3 moves ahead of the user US3 in the real space, and then the user US3 follows this movement with a delay. This suppresses an event that the user and the other user US3 collide with each other in the real space. At this time, the notification process for warning as illustrated in FIG. 13A to FIG. 14 may be performed as well.

Referring to FIG. 18, after the movement speeds of the moving bodies MV2 and MV3 are accelerated, it is desired to perform the process of making the balance by decelerating the movement speeds of the moving bodies MV2 and MV3 so that the positions of the users US2 and US3 correspond to the positions of the moving bodies MV2 and MV3.

In addition, as far as there is no problem with game world settings, the occurrence of a collision may be suppressed by displaying an effect for emphasizing a moving body approaching at a high movement speed, a predicted movement direction, or an alert indicating the existence and direction of an object approaching outside the field of view.

For example, referring to FIG. 19, an effect EF for emphasis display is applied to the moving body MV3 moving at a high movement speed. In addition, a marker MK2 is also displayed to indicate the predicted movement direction of the moving body MV3. Displaying the effect EF and the marker MK2 allows the user to visually recognize the movement speed and the movement direction of the moving body MV3, thereby further suppressing the occurrence of a collision between users. In addition, referring to FIG. 19, a marker MK1 is displayed to indicate the direction of existence of the moving body MV2. This allows the user to visually recognize the existence of the moving body MV2 in the direction indicated by the marker MK1, thereby suppressing the occurrence of a collision with the other user US2 corresponding to the moving body MV2.

Figure 20:
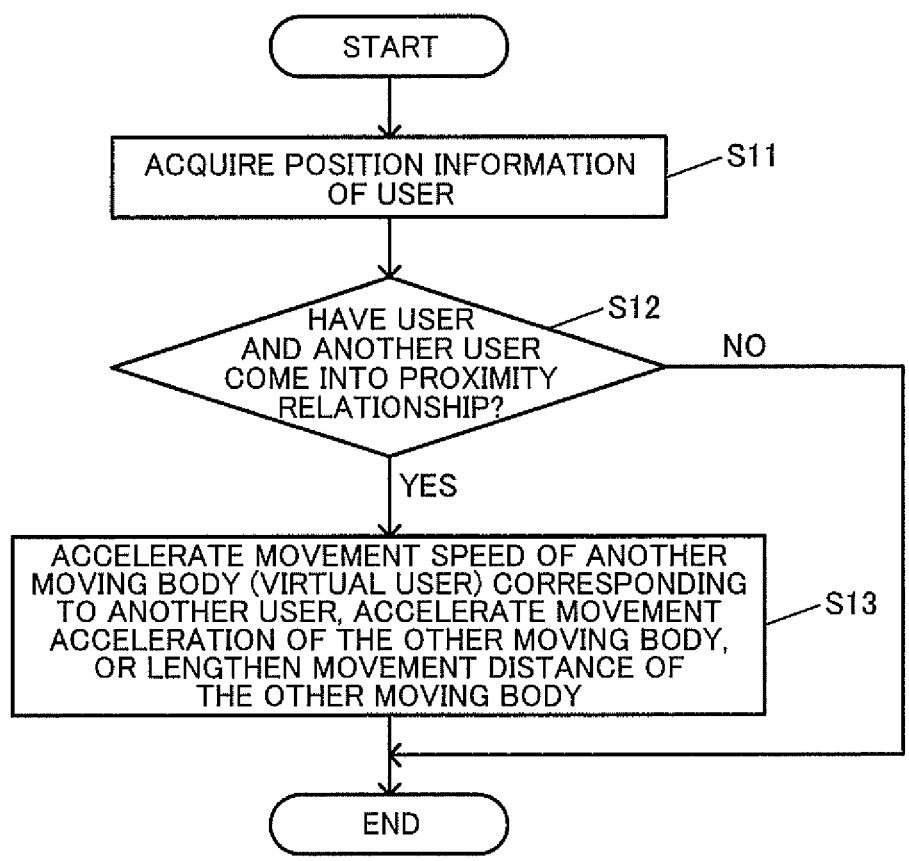
FIG. 20 is a flowchart of a process of accelerating a movement speed of another moving body corresponding to another user.

FIG. 20 is a flowchart of an example of a process of accelerating the movement speed of another moving body corresponding to another user.

First, similarly to steps S1 and S2 illustrated in FIG. 16, the position information of the user is acquired to determine whether the user and another user have come into a proximity relationship (steps S11 and S12). For example, as described above with reference to FIG. 13A and FIG. 13B, it is determined whether the users have come into the proximity relationship by determining whether the user US2 has entered the detection range ARD set for the user US1. When it is determined that the user and another user have come into the proximity relationship, the process of accelerating the movement speed of another moving body corresponding to another user (virtual user or avatar), accelerating the movement acceleration of the other moving body, or lengthening the movement distance of the other moving body is performed (step S13). Specifically, as illustrated by B1 and B2 in FIG. 18, the process of accelerating the movement speeds of the moving bodies MV2 and MV3 corresponding to the users US2 and US3 in the real space, accelerating the movement acceleration of the other moving body, or lengthening the movement distance of the other moving body is performed. This suppresses the occurrence of an event that the user and the other users US2 and US3 collide with each other.

3.4 Effecting Process

In the present embodiment, when the moving body corresponding to the user and another moving body corresponding to another user have come into the given positional relationship, an effecting process and a generation process of an effected image are performed according to a given positional relationship. Specifically, when the user and another user have not come into a proximity relationship but the moving body and another moving body have come into a proximity relationship, the effecting process and a generation process of the effected image are performed according to the proximity relationship. For example, an effecting process of causing at least one of a moving body and another moving body to make special motions and a generation process of an effected image are performed, or an effecting process of shifting to a special mode for the given positional relationship and a generation process of an effected image are performed.

For example, referring to FIG. 21A, the user US1 is located in the field FL1 of the real space, and the user US2 is located in the field FL2 of the real space. The moving body MV1 corresponding to the user US1 and the moving body MV2 corresponding to the user US2 are arranged in the common virtual field FLV. In addition, referring to FIG. 21A, the users US1 and US2 are opposed to each other with a given distance therebetween.

Referring to FIG. 21B, the user US1 is moving in the field FL1 of the real space to the right as the forward side of the user US1, for example. The user US2 is moving in the field FL2 of the real space to the left as the forward side of the user US2, for example. Accordingly, in the virtual field FLV, the moving bodies MV1 and MV2 corresponding to the users US1 and US2 have come into a proximity relationship and a collision state (immediately before a collision).

After that, referring to FIG. 21C, the user US1 further moves to the right in the field FL1, and the user US2 further moves to the left in the field FL2. Accordingly, in the virtual field FLV, the moving bodies MV1 and MV2 are back to back and are passing each other.

In the present embodiment, although the users US1 and US2 are located in the different fields FL1 and FL2 of the real space, the moving bodies MV1 and MV2 corresponding to the users US1 and US2 are located in the common virtual field FLV of the virtual space. Accordingly, as illustrated in FIG. 21B, even though the users US1 and US2 are not in the collision state in the real space, the corresponding moving bodies MV1 and MV2 are in the collision state in the virtual space. In such a situation, the users US1 and US2 see the moving bodies MV1 and MV2 passing through each other as if they are lack of substance and feel an unnatural sense.

To avoid such an event, in the present embodiment, as illustrated in FIG. 21B, when the moving body MV1 corresponding to the user US1 and the other moving body MV2 corresponding to the other user US2 have come into a given positional relationship such as a proximity relationship, the effecting process corresponding to the positional relationship is executed and the effected image is displayed on the HMDs of the users US1 and US2. Specifically, when, even though the user US1 and the other user US2 have not come into the proximity relationship in the fields FL1 and FL2 of the real space, the moving body MV1 and the other moving body MV2 have come into the proximity relationship in the virtual field FLV of the virtual space, the effecting process corresponding to the proximity relationship is executed and the effected image is displayed on the HMDs as illustrated in FIG. 21B. Accordingly, it is possible to avoid the situation in which, even though users are not passing by each other in the real space, the moving bodies appear as if they are passing through each other in the virtual space with deterioration in virtual reality of the users.

In the period during which the effecting process is performed as illustrated in FIG. 21B, it is desired to make a setting of disabling other moving bodies' attacks to the moving bodies MV1 and MV2. For example, shooting determination is set as an exceptional process and the moving bodies MV1 and MV2 are not touched (invincible state) in the meantime.

There are various possible methods for the effecting process to be performed in the state illustrated in FIG. 21B. For example, the effecting process of causing at least one of the moving bodies MV1 and MV2 to make special motions may be performed. For example, when the user US1 or US2 has entered a given distance range and these users have come into a proximity relationship, the corresponding moving body MV1 or MV2 is caused to make special motions such as jostling with each other.

Figure 22A:
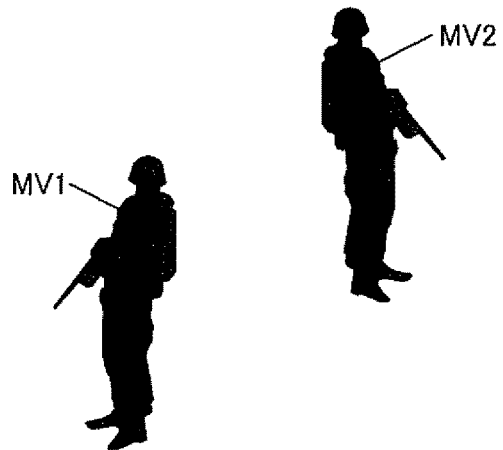
FIG. 22A to FIG. 22C are diagrams illustrating an example of a special motion process.
Figure 22B:
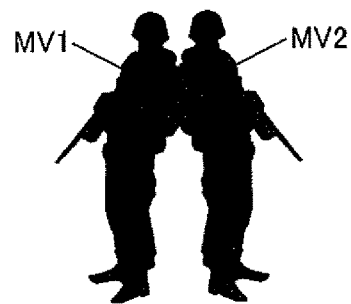
Figure 22C:
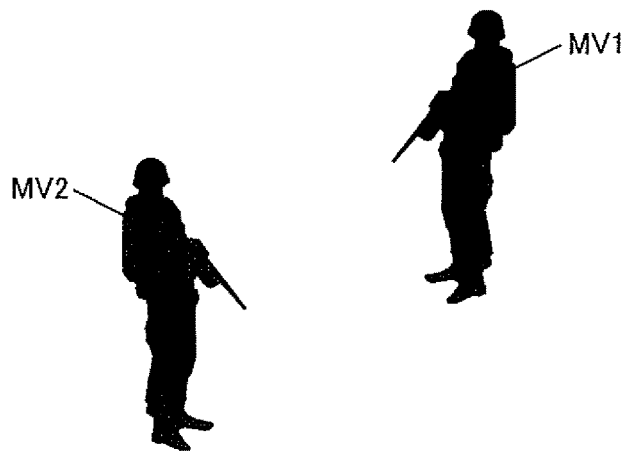

FIG. 22A to FIG. 22C are diagrams illustrating such a special motion process. In the special motion process, the moving bodies MV1 and MV2 in the state illustrated in FIG. 22A perform the action of jostling with each other back to back as illustrated in FIG. 22B, and then they separate from each other as illustrated in FIG. 22C. The series of motions illustrated in FIG. 22A to FIG. 22C are stored in the storage section 170 illustrated in FIG. 1 as special motion data to be reproduced in the state illustrated in FIG. 21B. Then, as the effecting process illustrated in FIG. 21B, the process of reproducing the special motions (the special motion process at the time of a collision) is performed.

Performing the special motion process makes it possible to generate the image in which the moving bodies are jostling with and passing by each other, for example, in the situation illustrated in FIG. 21B. This suppresses the occurrence of an event that the users are caused to feel an unnatural sense with deterioration in virtual reality.

The special motion process is not limited to the motion process illustrated in FIG. 22A to FIG. 22C but various modifications can be carried out. For example, as the special motion process, various motion processes of moving one moving body while avoiding the other moving body or moving one moving body while leaping over the other moving body can be used. In addition, in period (frame) during which the special motion process is performed, it is desired to make a setting of disabling attacks from other moving bodies (invincibility setting).

In the present embodiment, as the effecting process to be performed in the state illustrated in FIG. 21B, a effecting process of shifting to a special mode for a proximity relationship (broadly, for a given positional relationship) may be performed. That is, the process of shifting from the normal mode to the special game mode prepared for a proximity relationship is performed.

Figure 23:
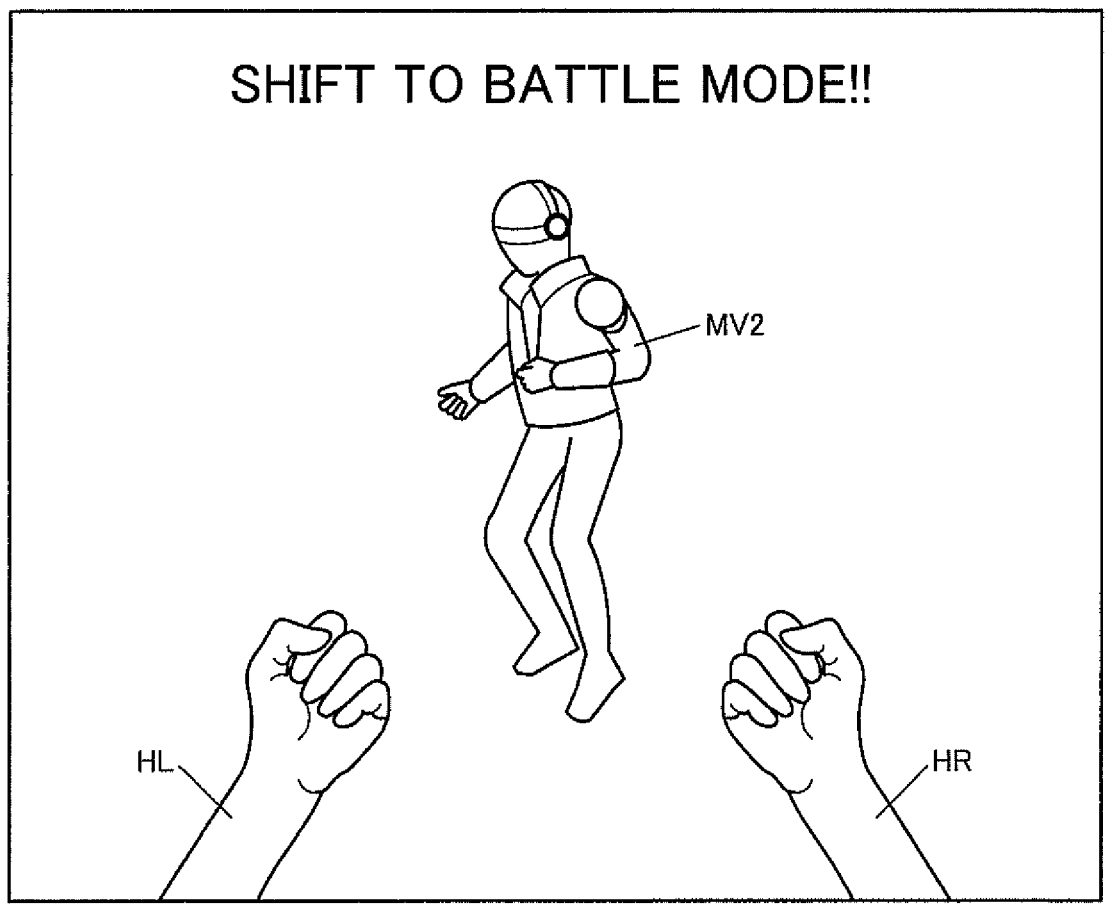
FIG. 23 is a diagram illustrating an example of a special mode.

FIG. 23 is a diagram illustrating an example of a special mode. This special mode is a battle mode for fighting with bare hands. Specifically, when the moving bodies have come into a proximity relationship as illustrated in FIG. 21B, the game shifts from the normal mode for a battle by guns (normal game mode) to the special mode for a battle mode for fighting with bare hands (HL and HR). While the moving bodies are in proximity to each other, the special mode is continued. When the moving bodies are separated from each other, the special mode is canceled.

In the special mode, it is desired to make a setting of disabling attacks from other moving bodies (invincibility setting). In this case, when the duration of the special mode exceeds a limited time period, for example, the gameplay by the users may be terminated.

To detect the motion of the users' hands or legs in the special mode illustrated in FIG. 23, motion detection devices (sensors) may be attached to the hands or legs, for example. Then, based on the results of motion detection using the motion detection devices, the hands or legs of the moving bodies corresponding to the users are moved. This implements a battle game where the moving bodies fight a battle. The motion detection devices may be the light receiving elements as illustrated in FIG. 2A or the light emitting elements as illustrated in FIG. 3A, for example. In the case of using the light receiving elements, the base stations 280 and 284 as illustrated in FIG. 2B can be used to detect the motions of the users' hands or legs in the special mode. In the case of using the light emitting elements, the image capturing section 150 as illustrated in FIG. 3B can be used to detect the motions of the users' hands or legs in the special mode. Alternatively, as the motion detection devices, motion sensors may be attached to the users' hands or legs to detect the motions of the body parts. Alternatively, cameras for motion detection may be used to detect the motions of the users.

In the case where the game shifts from the normal mode to the special mode as illustrated in FIG. 23, the guns held by the moving bodies are temporarily brought into a non-display state. Then, when the game returns from the special mode to the normal mode, the moving bodies are caused to hold the guns again.

Figure 24:
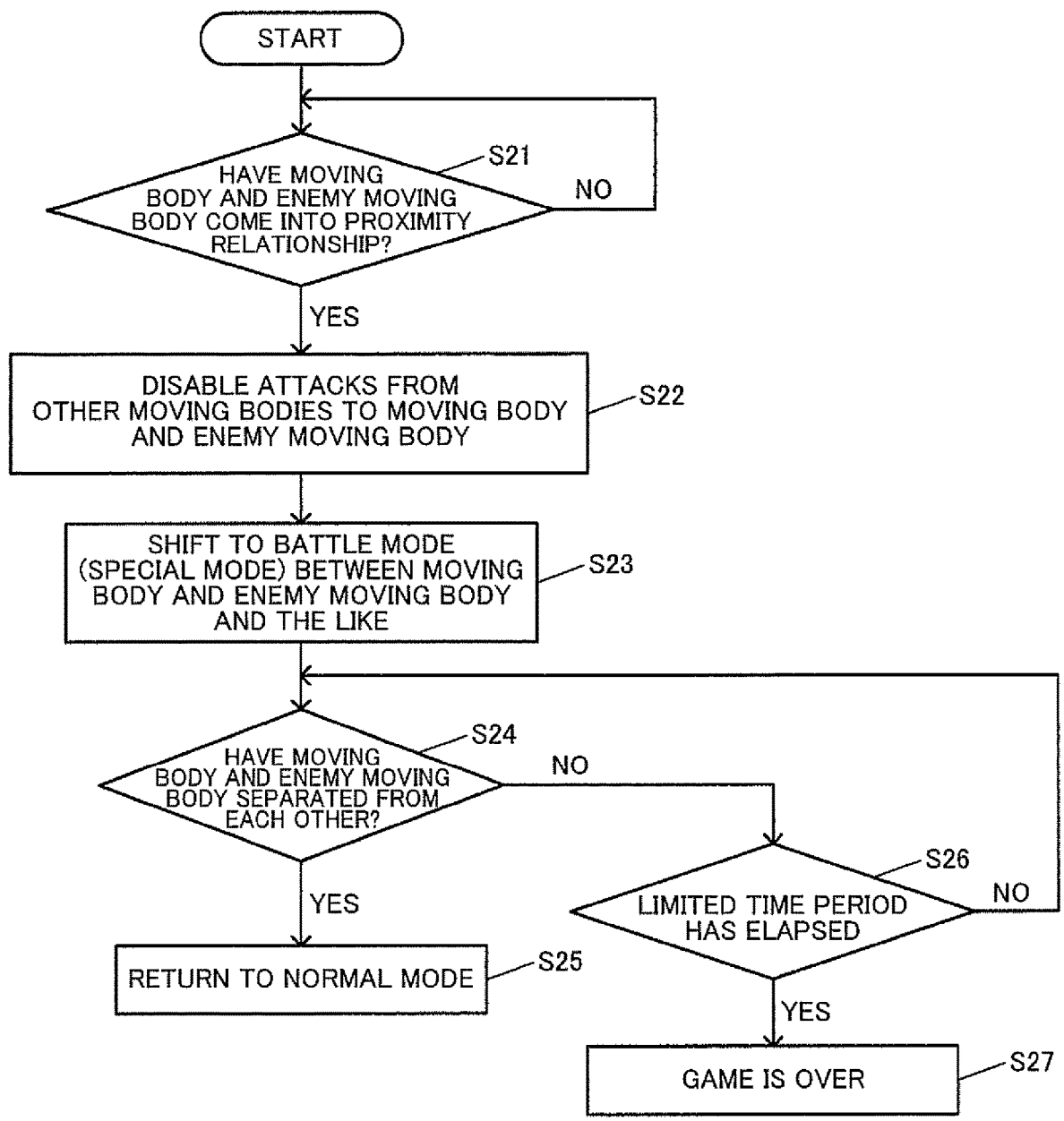
FIG. 24 is a flowchart of an effecting process to be performed when a moving body and another moving body have come into a proximity relationship.

FIG. 24 is a flowchart of an example of an effecting process to be performed when a moving body and another moving body have come into a proximity relationship.

First, it is determined whether the moving body and the enemy moving body have come into a proximity relationship (step S21). For example, it is determined whether the moving bodies have come into the proximity relationship as illustrated in FIG. 21B in the virtual field. When the moving bodies have come into the proximity relationship, attacks from other moving bodies to the moving body and the enemy moving body are disabled (step S22). That is, the game is set to an invincibility state. Then, the game shifts to a battle mode (broadly, a special mode) where the moving body and the enemy moving body fight a battle with bare hands (step S23). That is, the game shifts from the normal mode to the battle mode as illustrated in FIG. 23.

Next, it is determined whether the distance between the moving body and the enemy moving body has become longer (step S24). When it is determined that the moving body and the enemy moving body have separated from each other, the game returns to the normal mode (step S25). On the other hand, when it is not determined that the moving body and the enemy moving body have separated from each other, it is then determined whether a limited time period has elapsed (step S26). When the limited time period has elapsed, the gameplay by the users is terminated (step S27).

In accordance with one of some embodiments described above, it is possible to provide a simulation system that implements virtual experience with high virtual reality while suppressing the occurrence of collisions between users in the system using a head mounted display, a processing method, and an information storage medium.

One of some embodiments relates to a simulation system including a processor including hardware. The processor performs: an information acquisition process of acquiring position information of a user wearing a head mounted display to cover his/her field of view; a virtual space setting process of setting a virtual space where a moving body corresponding to the user is arranged and set based on the acquired position information; a moving body process of moving the moving body in the virtual space based on the acquired position information; and a display process of generating a display image on the head mounted display worn by the user. In the virtual space setting process, the processor sets the virtual space such that a first moving body group corresponding to a first user group positioned in a first field of a real space and a second moving body group corresponding to a second user group positioned in a second field different from the first field of the real space are arranged and set in a common virtual field of the virtual space.

In accordance with one of some embodiments, the position information of the user is acquired, and the arrangement and setting process and the movement process of the moving body in the virtual space are performed based on the acquired position information, and the display image on the head mounted display worn by the user is generated. In accordance with one of some embodiments, the first moving body group corresponding to the first user group positioned in the first field of the real space and the second moving body group corresponding to the second user group positioned in the second field of the real space are arranged and set in the common virtual field of the virtual space. Preparing the first and second fields makes it possible to arrange and set the first and second moving body groups corresponding to the first and second user groups in the common virtual field of the virtual space while preventing collisions between users in the real space, and execute the movement process and others of the moving bodies. Therefore, it is possible to, in the system using the head mounted displays, provide a simulation system that implements virtual experience with high virtual reality while suppressing the occurrence of collisions between users.

In accordance with one of some embodiments, the processor may perform a game process of a battle between the first user group belonging to a first group and the second user group belonging to a second group.

This implements an interesting group battle game while suppressing the occurrence of collisions between users.

In accordance with one of some embodiments, the processor may perform a generation process of sounds to be output to the user based on the position information of the moving body in the virtual field of the virtual space.

This makes it possible to form a sound field with higher virtual reality while suppressing the occurrence of collisions between users.

In accordance with one of some embodiments, the processor may perform a prediction process of a collision between users in the real space, and based on a result of the prediction process, a notification process for warning of a collision between the users.

This makes it possible to properly notify users that there is the risk of a collision between the users.

In accordance with one of some embodiments, the processor may perform a detection process of a motion of equipment of the user or a motion of the user in the real space, and based on a result of the detection in the detection process, a notification process for warning about the motion of the equipment or the motion of the user.

This makes it possible to properly notify that there is the risk of the equipment or body part of the user colliding with another user.

In accordance with one of some embodiments, the processor may perform the notification process on the condition that it is determined based on the position information of the user and another user that the user and the other user are in a proximity relationship.

This prevents an event that, even though the users are not in a proximity relationship, the detection process of the motion of the equipment or the motion of the user is unnecessarily performed or an unnecessary warning is issued.

In accordance with one of some embodiments, in the moving body process, the processor may perform a process of moving the moving body in the virtual space by a movement amount different from the movement amount of the user in the real space.

This causes the user to hesitate the movement by a large amount, which makes it possible to effectively avoid a collision between users.

In accordance with one of some embodiments, in the moving body process, when it is determined that the user and another user in the real space have come into a proximity relationship, the processor may perform a movement process of accelerating a movement speed of another moving body corresponding to the other user, accelerating a movement acceleration of the other moving body, or lengthening a movement distance of the other moving body.

This causes the other moving body to move ahead of the other user in the real space, which suppresses an event that the user and the other user collide with each other in the real space.

In accordance with one of some embodiments, in the display process, when the moving body corresponding to the user and another moving body corresponding to another user have come into a given positional relationship, the processor may perform a generation process of an effected image according to the given positional relationship.

Accordingly, when a moving body and another moving body corresponding to a user and another user have come into the given positional relationship, the effecting process is performed to generate the effected image according to the positional relationship, thereby preventing an event that the users feel an unnatural sense.

In accordance with one of some embodiments, in the display process, the processor may perform the generation process of the effected image, while the user and the other user in the real space have not come into a proximity relationship, when the moving body and the other moving body in the virtual space have come into a proximity relationship.

This prevents an event that, even though users in the real space are not passing by each other, moving bodies in the virtual space appear to be passing through each other, and the users thus feel an unnatural sense, for example.

In accordance with one of some embodiments, in the display process, the processor may perform the generation process of the effected image in which at least one of the moving body and the other moving body makes a special motion or the generation process of the effected image in which the game shifts to a special mode for the given positional relationship.

This implements the effecting process to be performed when a moving body and another moving body have come into a given positional relationship by a process of causing the moving body or the other moving body to make a special motion or a process of shifting to the special mode for the given positional relationship.

One of some embodiments may include the first field in which the first user group is movable and the second field in which the second user group is movable.

Providing the first and second fields makes it possible to provide a simulation system that implements virtual experience with high virtual reality while suppressing the occurrence of collisions between users.

One of some embodiments relates to a processing method including: an information acquisition process of acquiring position information of a user wearing a head mounted display to cover his/her field of view; a virtual space setting process of setting a virtual space where a moving body corresponding to the user is arranged and set based on the acquired position information; a moving body process of moving the moving body in the virtual space based on the acquired position information; and a display process of generating a display image on the head mounted display worn by the user. In the virtual space setting process, the processor sets the virtual space such that a first moving body group corresponding to a first user group positioned in a first field of a real space and a second moving body group corresponding to a second user group positioned in a second field different from the first field of the real space are arranged and set in a common virtual field of the virtual space.

Although the present embodiments have been described in detail above, those skilled in the art will readily appreciate that many modifications are possible in the embodiment without materially departing from the novel teachings and advantages of the present disclosure. Accordingly, all such modifications are intended to be included within the scope of the present disclosure. For example, in the specification or the drawings, each of terms (such as team, controller, or origin point) that is at least once used together with another broader-sense or synonymous term (such as group, equipment, or reference point) can be replaced with the other term at any part of the specification or the drawings. The acquisition process of the position information, the setting process of the virtual space, the movement process of the moving body, the display process, the game process, the notification process, the arrangement and setting process of the moving body, the effecting process, and others are not limited to those described in the present embodiment. The scope of the present disclosure includes methods, processes and configurations equivalent to these. The embodiments can be applied to various games. The embodiments can be applied to various simulation systems such as an arcade game apparatus, a consumer game apparatus, a large attraction system where a large number of users play the game, and the like.

What is claimed is:

1. A simulation system comprising:
   a processor including hardware, the processor being configured to perform:
   an information acquisition process of acquiring position information of a user wearing a head mounted display to cover his/her field of view;
   a virtual space setting process of setting a virtual space where a moving body corresponding to the user is arranged and set based on the acquired position information;
   a moving body process of moving the moving body in the virtual space based on the acquired position information; and
   a display process of generating a display image on the head mounted display worn by the user, wherein:
   in the virtual space setting process, the processor performs
      setting the virtual space such that a first moving body group corresponding to a first user group positioned in a first field of a real space and a second moving body group corresponding to a second user group positioned in a second field different from the first field of the real space are arranged and set in a common virtual field of the virtual space,
      each of the first user group and the second user group including at least one user, and
   in the moving body process, the processor performs
      a process of moving the moving body in the virtual space by a movement amount different from a movement amount of the user in the real space, and
      in response to determining that the user and another user in the real space satisfy a proximity relationship, a movement process of: (i) accelerating a movement speed of another moving body corresponding to the other user, (ii) accelerating a movement acceleration of the other moving body, or (iii) lengthening a movement distance of the other moving body.

2. The simulation system as defined in claim 1, wherein the processor performs
   a game process of a battle between the first user group belonging to a first group and the second user group belonging to a second group.

3. The simulation system as defined in claim 1, wherein the processor performs
   a generation process of sounds to be output to the user based on the position information of the moving body in the virtual field of the virtual space.

4. The simulation system as defined in claim 1, wherein the processor performs
   a prediction process of a collision between users in the real space, and based on a result of the prediction process, a notification process for warning of a collision between the users.

5. The simulation system as defined in claim 1, wherein the processor performs
   a detection process of a motion of equipment of the user or a motion of the user in the real space, and based on a result of the detection in the detection process, a notification process for warning about the motion of the equipment or the motion of the user.

6. The simulation system as defined in claim 5, wherein the processor performs
   the notification process on the condition that it is determined based on the position information of the user and another user that the user and the other user are in a proximity relationship.

7. The simulation system as defined in claim 1, wherein in the display process, the processor performs,
   when the moving body corresponding to the user and another moving body corresponding to another user have come into a given positional relationship, a generation process of an effected image according to the given positional relationship.

8. The simulation system as defined in claim 7, wherein in the display process, the processor performs
the generation process of the effected image, while the user and the other user in the real space have not come into a proximity relationship, when the moving body and the other moving body in the virtual space have come into a proximity relationship.

9. The simulation system as defined in claim 7, wherein in the display process, the processor performs
the generation process of the effected image in which at least one of the moving body and the other moving body makes a special motion or the generation process of the effected image in which the game shifts to a special mode for the given positional relationship.

10. The simulation system as defined in claim 1, comprising:
the first field in which the first user group is movable; and
the second field in which the second user group is movable.

11. A simulation system comprising:
a processor including hardware, the processor being configured to perform:
an information acquisition process of acquiring position information of a user wearing a head mounted display to cover his/her field of view;
a virtual space setting process of setting a virtual space where a moving body corresponding to the user is arranged and set based on the acquired position information;
a moving body process of moving the moving body in the virtual space based on the acquired position information; and
a display process of generating a display image on the head mounted display worn by the user, wherein:
in the virtual space setting process, the processor performs
setting the virtual space such that a first moving body group corresponding to a first user group positioned in a first field of a real space and a second moving body group corresponding to a second user group positioned in a second field different from the first field of the real space are arranged and set in a common virtual field of the virtual space,
each of the first user group and the second user group including at least one user, and
in the moving body process, the processor performs
in response to determining that the user and another user in the real space satisfy a proximity relationship, a movement process of: (i) accelerating a movement speed of another moving body corresponding to the other user, (ii) accelerating a movement acceleration of the other moving body, or (iii) lengthening a movement distance of the other moving body.

12. A processing method for use with a user wearing a head mounted display, the processing method comprising:
acquiring, by a processor, position information of the user wearing the head mounted display to cover their field of view;
setting, by the processor, a virtual space where a moving body corresponding to the user is arranged and set based on the acquired position information, including:
setting the virtual space such that: (a) a first moving body group corresponding to a first user group positioned in a first field of a real space, and (b) a second moving body group corresponding to a second user group positioned in a second field different from the first field of the real space, are arranged and set in a common virtual field of the virtual space, and
each of the first user group and the second user group include at least one user;
moving, by the processor, the moving body in the virtual space based on the acquired position including:
in response to determining that the user and another user in the real space satisfy a proximity relationship, performing a movement process of: (i) accelerating a movement speed of another moving body corresponding to the other user, (ii) accelerating a movement acceleration of the other moving body, or (iii) lengthening a movement distance of the other moving body; and
generating, by the processor, a display image on the head mounted display worn by the user.

13. A processing method for use with a user wearing a head mounted display, the processing method comprising:
acquiring, by a processor, position information of a user wearing a head mounted display to cover his/her field of view;
setting, by the processor, a virtual space where a moving body corresponding to the user is arranged and set based on the acquired position information, including:
setting the virtual space such that: (a) a first moving body group corresponding to a first user group positioned in a first field of a real space, and (b) a second moving body group corresponding to a second user group positioned in a second field different from the first field of the real space, are arranged and set in a common virtual field of the virtual space, and
each of the first user group and the second user group include at least one user;
moving, by the processor, the moving body in the virtual space based on the acquired position information, including:
in response to determining that the user and another user in the real space satisfy a proximity relationship, performing a movement process of: (i) accelerating a movement speed of another moving body corresponding to the other user, (ii) accelerating a movement acceleration of the other moving body, or (iii) lengthening a movement distance of the other moving body; and
generating, by the processor, a display image on the head mounted display worn by the user.

14. A non-transitory computer-readable information storage medium storing a program for causing a computer to perform the processing method as defined in claim 12.

15. A non-transitory computer-readable information storage medium storing a program for causing a computer to perform the processing method as defined in claim 13.

* * * * *